(12) United States Patent
Cormode et al.

(10) Patent No.: US 7,742,424 B2
(45) Date of Patent: Jun. 22, 2010

(54) COMMUNICATION-EFFICIENT DISTRIBUTED MONITORING OF THRESHOLDED COUNTS

(75) Inventors: Graham R. Cormode, Summit, NJ (US); Ram Keralapura, Davis, CA (US); Jeyashankher Sr, Bangalore (IN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 733 days.

(21) Appl. No.: 11/423,322

(22) Filed: Jun. 9, 2006

(65) Prior Publication Data

US 2007/0286071 A1 Dec. 13, 2007

(51) Int. Cl.
*G01R 31/08* (2006.01)
(52) U.S. Cl. .................................. 370/241
(58) Field of Classification Search ........... 370/241
See application file for complete search history.

(56) References Cited

U.S. PATENT DOCUMENTS

| | | | | |
|---|---|---|---|---|
| 4,483,076 A | * | 11/1984 | Brooks | 33/123 |
| 4,671,650 A | * | 6/1987 | Hirzel et al. | 356/28 |
| 6,144,691 A | * | 11/2000 | Kenney | 375/130 |
| 6,219,728 B1 | * | 4/2001 | Yin | 710/52 |
| 6,476,516 B1 | * | 11/2002 | Reich | 307/10.1 |
| 6,859,786 B1 | * | 2/2005 | Goodwin et al. | 705/20 |
| 2007/0136285 A1 | * | 6/2007 | Cormode et al. | 707/7 |

OTHER PUBLICATIONS

Graham Cormode, Minos Garofalakis, S. Muthukrishnan, Rajeev Rastogi, Holistic Aggregates in a Networked World: Distributed Tracking of Approximate Quantiles, (SIGMOD 2005 Jun. 14-16, 2005).*

D. Abadi, D. Carney, U. C, etintemel, M. Cherniack, C. Convey, C. Erwin, E. Galvez, M. Hatoun, A. Maskey, A. Rasin, A. Singer, M. Stonebraker, N. Tatbul, Y. Xing, R. Yan, and S. Zdonik. Aurora: a data stream management system. In Proceedings of ACM SIGMOD , p. 666, 2003.

A. Arasu, B. Babcock, S. Babu, M. Datar, K. Ito, I. Nishizawa, J. Rosenstein, and J; Widom. STREAM: the Stanford Stream Data Manager (demonstration description). In Proceedings of ACM SIGMOD , pp. 665-665, 2003.

B. Babcock and C. Olston. Distributed top-k monitoring. In Proceedings of ACM SIGMOD , 2003.

S. Chandrasekaran, O. Cooper, A. Deshpande, M. J. Franklin, J. M. Hellerstein, W. Hong, S. Krishnamurthy, S. R. Madden, F. Reiss, and M. A. Shah. TelegraphCQ: continuous dataflow processing. In Proceedings of ACM SIGMOD , p. 668, 2003.

(Continued)

*Primary Examiner*—Derrick W Ferris
*Assistant Examiner*—Mang Yeung
(74) *Attorney, Agent, or Firm*—Wall & Tong, LLP

(57) ABSTRACT

A system, method, and computer program product for distributed monitoring of local thresholds at each of a number of monitoring nodes and initiating communication only after the locally observed data exceeds the local threshold. Both static thresholds and adaptive thresholds are considered. In the static case, a combination of two alternate strategies for considering thresholds minimizes communication overhead. In the adaptive case, local thresholds are adjusted based on the observed distributions of updated information in the distributed monitoring system. Both approaches yield significant savings over the naïve approach of performing processing at a centralized location.

17 Claims, 12 Drawing Sheets

OTHER PUBLICATIONS

M. Cherniack, H. Balakrishnan, M. Balazinska, D. Carney, U. Cetintemel, Y. Xing, and S. Zdonik. Scalable distributed stream processing. In Proccedings of Conference on Innovative Data Systems Research, 2003.

J. Considine, F. Li, G. Kollios, and J. Byers. Approximate aggregation techniques for sensor databases. In IEEE ICDE, 2004.

G. Cormode and M. Garofalakis. Sketching streams through the net: Distributed approximate query tracking. In Proceedings of VLDB, 2005.

G. Cormode, M. Garofalakis, S. Muthukrishnan, and R. Rastogi. Holistic aggregates in a networked world: Distributed tracking of approximate quantiles. In Proceedings of ACM SIGMOD , 2005.

G. Cormode and S. Muthukrishnan. An improved data stream summary: The count-min sketch and its applications. Journal of Algorithms 55(1), pp. 58-75, 2005.

G. Cormode, S. Muthukrishnan, and W. Zhuang. What's different: Distributed, continuous monitoring of duplicate resilient aggregates on data streams. In IEEE ICDE, 2006.

Cranor, T. Johnson, O. Spatscheck, and V. Shkapenyuk. Gigascope: A stream database for network applications. In Proceedings of ACM SIGMOD, pp. 647-651, 2003.

A. Das, S. Ganguly, M. Garofalakis, and R. Rastogi. Distributed set-expression cardinality estimation. In Proceedings of VLDB, 2004.

C. Estan and G. Varghese. New directions in traffic measurement and accounting. In Proceedings of ACM SIGCOMM, vol. 32, 4 of Computer Communication Review, pp. 323-338, 2002.

Ahmad et. al. Distributed operation in the borealis stream processing engine. In Proceedings of ACM SIGMOD, 2005.

A. Jain, J. Hellerstein, S. Ratnasamy, and D. Wetherall. A wakeup call for internet monitoring systems: The case for distributed triggers. In Proceedings of Hotnets, 2004.

N. Jain, P. Yalagandula, M. Dahlin, and Y. Zhang. Insight: a distributed monitoring system for tracking continuous queries. In Work-in-progress session at ACM SOSP, 2005.

A. Manjhi, S. Nath, and P. Gibbons. Tributaries and deltas: Efficient and robust aggregation in sensor network streams. In Proceedings of ACM SIGMOD, 2005.

G.S. Manku and R. Motwani. Approximate frequency counts over data streams. In Proceedings of VLDB, pp. 346-357, 2002.

S. Nath, P. B. Gibbons, S. Seshan, and Z. R. Anderson. Synopsis diffusion for robust aggrgation in sensor networks. In ACM SenSys, 2004.

National Laboratory for Applied Network Research. http://www.nlanr.net/.

C. Olston, J. Jiang, and J. Widom. Adaptive filters for continuous queries over distributed data streams. In Proceedings of ACM SIGMOD , 2003.

Stanford stream data manager. http://www-db.stanford.edu/stream/sqr.

M. Sullivan and A. Heybey. A system for managing large databases of network traffic. In Proceedings of USENIX, 1998.

S. Zdonik, M. Stonebraker, M. Cherniack, and U. Cetintemel. The Aurora and Medusa projects. Bulletin of the Technical Committee on Data Engineering, pp. 3-10, Mar. 2003.

M. Dilman and D. Raz, Efficeitn Reactive Monitoring, IEEE INFOCOM 2001.

Pending U.S. Appl. No. 11/392,440.

Pending U.S. Appl. No. 11/389,040.

* cited by examiner

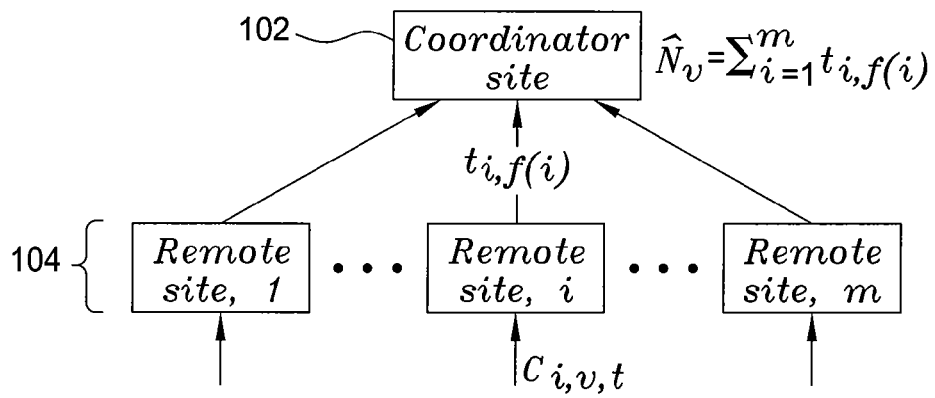

FIG. 1

BASIC ADAPT$(\delta, T, m)$

1: $t_{iL} \leftarrow 0; t_{iH} \leftarrow \frac{T}{m}; \hat{N} \leftarrow 0$

2: loop {receive update $(i, N_i)$; }

3:     if $((\hat{N} < (1-\delta)T)$ and $(\hat{N} + N_i - t_{iL} \geq (1-\delta)T))$ then

4:        poll all sites $j$ for $N_j; t_{jL} \leftarrow N_j$; send $t_{jH} \leftarrow (1+\delta)t_{jL}$;

5:        $t_{iL} \leftarrow N_i; \hat{N} \leftarrow \sum_{j=1}^{m} N_j$;

6:     if $(\hat{N} < (1-\delta)T)$ then

7:        for all $j$ send $t_{jH} \leftarrow t_{jL} \frac{T}{\hat{N}}$ to $j$;

8:     else

9:        send $t_{iH} \leftarrow t_{iL}(1-\delta)$ to $i$

FIG. 2

MODIFIED ADAPT($\delta, T, m$)

1: $t_{iL} \leftarrow 0; t_{iH} \leftarrow \frac{T}{m}; R \leftarrow \emptyset; \widehat{N} = 0;$ 2: loop {receive update $(i, N_i)$; }

3:     if ($\widehat{N} < (1-\delta)T$) and ($\widehat{N} - t_{iL} + N_i \geq (1-\delta)T$) then

4:         poll all sites $j$ for $N_j; t_{jL} \leftarrow N_j$; send $t_{jH} \leftarrow (1+\delta) t_{jL}$;

5:         if ($R = \emptyset$) then

6:             for $j = 1$ to $m$ do

7:                 Poll site $j$ for $N_j; t_{jL} \leftarrow N_j; s_j \leftarrow \max\{t_{jL}, \frac{\delta T}{m}\};$ 8:                 if $N_j < \frac{\delta T}{m}$ then send $t_{jH} \leftarrow \frac{\delta T}{m}$ to $j$ 9:         $t_{iL} \leftarrow N_i; \widehat{N} \leftarrow \sum_j t_{jL}; S_i \leftarrow t_{iL}; R \leftarrow R \cup \{i\};$ 10:        if ($\widehat{N} < (1-\delta)T$) then

11:            $S \leftarrow \sum_{r=1}^{m} s_r; t_{min} \leftarrow \min_j \{\frac{t_{jL}}{\sum_{r \in R} t_{rL}} (T-S)\};$ 12:            for all $j \in E$ do

13:                 if $t_{min} < \frac{\delta T}{m}$ then send $t_{jH} \leftarrow \frac{\delta T}{m}$ to $j$;

14:                 else send $t_{jH} \leftarrow t_{jL} + \frac{t_{jL}}{\sum_{r \in S} t_{rL}} (T-S)\}$ to $j$ 15:     else send $t_{iH} \leftarrow (1+\delta) t_{iL}$ to $i$;

FIG. 3

COMMUNICATION-EFFICIENT DISTRIBUTED MONITORING OF THRESHOLDED COUNTS

FIELD OF THE INVENTION

The present invention relates to networking, communications, and database management and, in particular, relates to communication for distributed monitoring systems.

BACKGROUND OF THE INVENTION

Monitoring is an issue of primary concern in current and next-generation network systems. The objective of sensor networks is to monitor their surroundings for a variety of important applications, such as atmospheric conditions, wildlife behavior, and troop movements, among others. Monitoring in data networks is critical not only for accounting and for management, but also for detecting anomalies and attacks. Such monitoring applications are inherently continuous and distributed and usually introduce a significant communication overhead.

Consequently, there is a pressing need to identify the fundamental problem of thresholded counts and to address this problem by setting local thresholds at each monitoring node and initiating communication only after the locally observed data exceeds these local thresholds.

SUMMARY

Exemplary embodiments of the present invention address the problem of thresholded counts by setting local thresholds that each monitoring node and initiating communication, only after the locally observed data exceeds local thresholds.

One embodiment is a method for distributed monitoring. A coordinator assigns one or more thresholds to each of a number of sites. Each site sends updates to the coordinator only after the threshold is violated at the site. The coordinator estimates a total count for all the sites based on the updates received.

Another embodiment is a computer readable medium storing instructions for performing this method.

Another embodiment is a system for distributed monitoring that includes a coordinator and a number of sites. Each site has one or more thresholds and each site only sends an update to the coordinator when the threshold is violated. The coordinator receives the updates, assigning the threshold(s), and estimates the total count for all the sites based on the updates received.

The threshold assignment may be uniform, proportional, or blended. In uniform threshold assignment, the threshold assignment is uniform so that a slack at each site is substantially the same; in proportional threshold assignment, the threshold is assigned at the time the threshold is violated to be proportional to a local count at the site; and in blended threshold assignment, threshold assignment is blended so that threshold assignment is a linear combination of a uniform threshold and a proportional threshold. A determined blend of uniform or proportional assignment may be adapted to minimize the number of updates. The threshold assignment may also be adapted after each threshold violation. The threshold assignment may be adapted after a first threshold violation and when the difference between the global threshold and the estimated current total count is small, i.e., less than a predetermined bound. The threshold may include both a lower threshold and an upper threshold sot that the constant difference between the lower and upper threshold is maintained for each site.

BRIEF DESCRIPTION OF THE DRAWINGS

The teachings of the present invention can be readily understood by considering the following detailed description in conjunction with the accompanying drawings, in which:

FIG. 1 is a block diagram showing the architecture of an exemplary embodiment of a distributed monitoring system;

FIG. 2 is an exemplary listing of pseudo code for a basic adaptive thresholding algorithm;

FIG. 3 is an exemplary listing of pseudo code for a modified adaptive thresholding algorithm;

To facilitate understanding, identical reference numerals have been used, where possible, to designate identical elements that are common to the figures.

DETAILED DESCRIPTION OF THE INVENTION

Figure 4A:
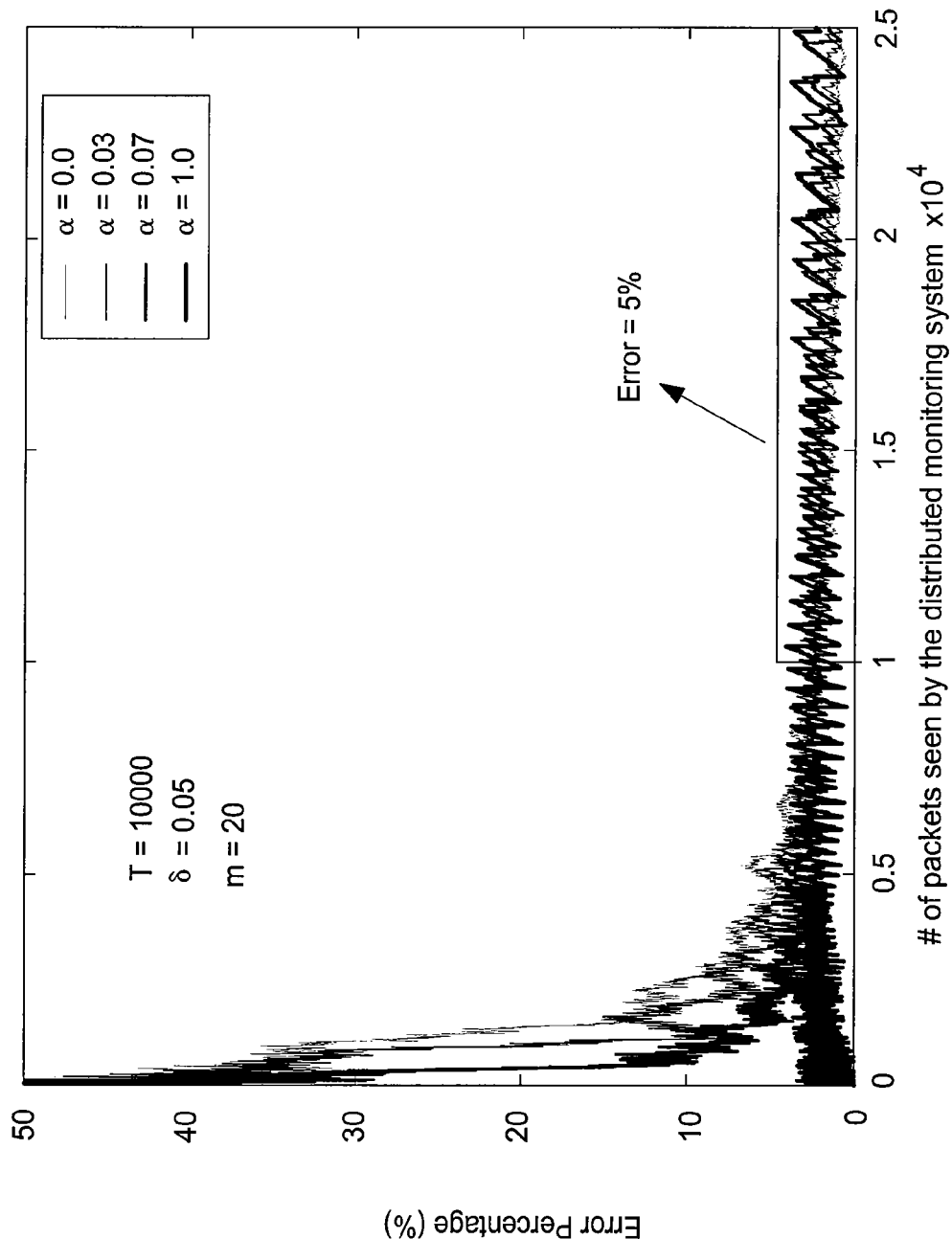
FIGS. 4A, 4B, 4C, and 4D are charts showing testing accuracy for static and adaptive cases in an experimental study.

The description of the present invention is primarily within a general context of distributed monitoring systems. However, those skilled in the art and informed by the teachings herein will realize that the invention is generally applicable to network traffic monitoring, sensor networks, network operation centers, cluster computing, collaborative computing, dependable systems, distributed agents, distributed databases, distributed multimedia, grid computing, middleware, mobile and pervasive systems, operating systems, peer-to-peer systems, parallel processing, real-time and embedded systems, network security, software engineering, web systems and may be applied in many industries, such as communications, security, power, environmental protection, weather, geology, military, medical, and others. Accordingly, the general concepts of the present invention are broadly applicable and are not limited to any particular field, application, or industry.

Introduction

Many emerging monitoring systems are fundamentally distributed in nature. The current and next-generation of networks are large-scale and widespread. Within this distributed networked system, a principal concern is monitoring either monitoring the environment surrounding each of the network nodes or monitoring the behavior of the network itself. Two prototypical applications are in: (1) sensor networks for monitoring and collecting information on atmospheric conditions, wildlife behavior and troop movements in military applications, among others, and (2) network traffic monitoring in wired or wireless data networks for traffic management routing optimization and anomaly and attack detection.

Over the past few years, the defining characteristics of these applications have been identified that pose new challenges not answered by traditional data management systems. The challenges arise mainly because many monitoring systems are inherently continuous, distributed, and resource constrained. Unlike the traditional database on-demand view of the world, where queries are posed in SQL and an answer is return to the user, queries in these monitoring situations are typically long-running queries over streams of data, which must continuously run and return answers as and when they are found. The data required to answer the monitoring queries is distributed throughout the network. Typically, a query and requires information to be collated and aggregated from many, if not all, nodes in the network. The efficiency of operation is vital in the distributed monitoring world. In sensor networks, it is desirable to extend the life of the network as long as possible by minimizing the energy drain of running the monitoring protocol. In data networks, it is desirable that the protocol does not hinder the principal operation of the network, allowing the delivery of messages unencumbered by the monitoring overhead. These concerns manifest themselves principally as a design constraint of minimizing (to the extent possible) the communication cost of the monitoring protocols. Communication is the principal energy drain for a sensor and excess communication in a data network reduces the capacity for normal operation. As a secondary concern, it is also desirable to minimize computation and memory usage for efficient execution of the monitoring.

Thresholded Counts

Within the framework of continuous, distributed, and resource-constrained systems, there are many possible types of monitoring queries that can be posed. Prior work has looked at particular query types, such as top-k monitoring, set expression cardinality, and holistic aggregates, such as quantiles. However, many queries rely at heart on monitoring sums or counts of values, in combination with thresholds (lower bounds). Consider the following exemplary queries from a variety of different domains in Table 1.

TABLE 1

Exemplary queries.

Report when at least 40 soldiers have crossed a specific boundary.
Raise an alert when the total number of cars on the highway exceeds 4,000 and report the number of vehicles detected.
Which species have more than 50 members within a certain region for more than an hour?
Identify all destinations that receive more than 2 GB of traffic from the monitor network in a day and report their transfer totals.
Monitor the volume of remote login request (e.g., telnet, SSH, FTP, etc.) received by hosts within an organization that originate from the external hosts.
Which users within the monitored network received more than 1,000 different connections?

In most of the above queries, there are two parts to the query: a request for a sum or account of a particular quantity (e.g., vehicles, animals, network connections) and a minimum threshold (or trigger) for when to provide the information (e.g., exceeding 4,000, more than 50, more than 2 GB). Such thresholds are vital in focusing the information returned to the user and in reducing the monitoring burden of the network. In almost every application involving measuring quantities like these, it is only important to know the quantities when they exceed a specified level. Small counts (e.g., remote logins human activity network traffic) are prevalent and can be ignored to reduce the reporting burden of the monitoring system. Nevertheless, it all the above situations, we can define the threshold, such that it is critical to know when this threshold has been crossed. Exemplary embodiments of the present invention focus on the design of protocols and algorithms to monitor such sums and counts with thresholds. In the extreme case, these thresholds can be trivial (i.e. zero or one). However, in all the scenarios outlined, a non-trivial threshold exists that can be used to reduce the communication cost. In general, the thresholds can be specified either as part of the query or learned by the system in response to the observed data. Without loss of generality, it is assumed that the threshold is fixed a priori and exemplary embodiments focus on answering queries for thresholded counts, given such a threshold. Dynamic thresholds may be accommodated, in other embodiments.

The second component of these types of queries is to return a count of a particular set of values. Here, one can observe that an application rarely needs to know the exact count so long as the answer is given with a reasonable position. For example, it is not necessary to know whether the number of cars on the highway is 4237 or 4251, if either answer is accurate to within 1%. Therefore, instead of demanding exact results, exemplary embodiments explore the trade-off between accuracy and communication. Clearly, allowing larger uncertainties about counts allows monitoring sites to be more conservative about when they send their updates to a central monitor. This benefit became clear in the experimental study results, which showed significant savings as the allowable uncertainty increased.

Overview

Exemplary embodiments address the problem of continuously monitoring thresholded counts in a distributed environment. First, it is desirable to introduce and formalize the thresholded counting problem, which is fundamental to several distributed monitoring scenarios. Exemplary embodiments provide guaranteed solutions to the monitoring problem by comparing local counts to local thresholds and postponing communication, until these thresholds are violated. Exemplary embodiments include two approaches, depending on whether the thresholds can be determined statically in advance or whether the thresholds can be allocated adaptively as the distribution of updated information is observed. Second, in the static case, exemplary embodiments include two different fundamental techniques for setting the local thresholds. One is a blended approach based on a linear combination of the two fundamental methods while retaining the correctness guarantee. A careful and detailed analysis of the optimal setting of this blended approach is provided, which depends only on coarse properties of the total count. Third, in the adaptive case, exemplary embodiments include a variety of increasingly sophisticated algorithms that attempt to capture the observed distribution of count updates and, hence, reduce the overall number of messages sent within the system. Fourth, exemplary embodiments may easily extend the static and adaptive algorithms to include negative updates, sliding windows, approximate counts, and time-dependent threshold values. Finally, a thorough and detailed experimental study was conducted to verify the efficacy of some exemplary embodiments of methods for providing low cost monitoring schemes for thresholded queries. Comparisons of the results of the experimental study to applications of prior work on a variety of real and synthetic data showed that there were significant savings by using the exemplary embodiments.

Problem Definition

It is desirable to first define the problem of efficiently maintaining approximate counts in a distributed scenario.

System Architecture

FIG. 1 shows the architecture of an exemplary embodiment of a distributed monitoring system. The system 100 comprises a number, m, of remote sites 104 and a central coordinator site 102. The remote sites 104 observe a continuous stream of updates, which, taken together, define a distribution of values. The remote sites 104 can communicate with the coordinator 102 in order to ensure that the coordinator 102 in order to accurately answer queries over the union of the update-stream. In general, the remote sites 104 can communicate among themselves as well as with the coordinator 102; however, this exemplary embodiment only considers protocols that have (pairwise) communications between the coordinator 102 and remote sites 104, as in most prior work.

Each site, $i \in \{1 \ldots m\}$ monitors a set of k values $N_{v,i}$, $v \in \{1 \ldots k\}$ which are defined incrementally. In this exemplary embodiment, each stream of updates observed at the remote site i is modeled as a sequence of tuples, $<i, v, t, c_{i,v,t}>$. This is interpreted as an update of $c_{i,v,t}$ to $N_v$ in site i at time t. Updates are ordered by timestamp and site i only sees updates to itself. Then, $N_{v,i}(t)$, the value of the count in site i at time t is defined as $$N_{v(t)} = \sum_{t' < t} c_{i,v,t'}.$$

The global count, $N_v(t)$, is defined as $$N_v(t) = \sum_{i \in \{1 \ldots m\}} N_{v,i}(t).$$

In this exemplary embodiment, the goal is to monitor the value of each $N_v(t)$ within specified accuracy bounds. Because this exemplary embodiment is interested only in the "current" value of counts, reference to t is dropped and $N_v$ and $N_{v,i}$ are used to represent the global and local counts.

This model accurately captures the scenarios described above. For example in network traffic monitoring, each update might correspond to the observation of a packet at a remote site 104 or monitor. In this context, t is the current time, i is the identifier of the monitor and v and $c_{i,v,t}$ are properties of the packet, such as the destination Internet protocol (IP) address and size of packet, respectively. Based on the inputs from all the remote sites 104, the coordinator 102 tracks the aggregate traffic to various destinations and raises an alarm when the total traffic becomes high, indicating an unusual activity (e.g., a distributed denial-of-service (DDoS) attack). Monitoring in sensor networks can also be mapped onto this model in a natural way.

In general, the updates, $c_{i,v,t}$, can be negative (corresponding to a decrease in $N_{v,i}$, e.g., temperature updates in sensor networks) or fractional (e.g., rainfall measurements). All of the exemplary embodiments handle such settings, but, for pedagogical reasons, this description initially focuses on the case where $c_{i,v,t}$ are positive integers, postponing the discussion of negative updates.

The Thresholded Count Problem

In one exemplary embodiment, the focus is on monitoring the $N_v$ at the central coordinator 102. Because $N_v$ is defined by updates to remote sites 104, if it were necessary to know $N_v$ exactly, then every update would be sent from a remote site 104 to the coordinator 102 as soon as it was observed. This would ensure accurate values at the coordinator 102 at all times, but would come with a huge communication overhead. Such fine accuracy is not needed in practice. Another possibility is for the remote sites 104 to send their counts periodically to the coordinator site 102. This reduces the communication burden, but still has some issues in practice. Updates and real systems are typically bursty, i.e., counts change rapidly in some time periods, while hardly changing in others. The former results in inaccurate values at the coordinator 102, while the latter results in unnecessary communications. The problem of continuously monitoring thresholded counts is defined to ensure that the coordinator 102 always has an accurate count with minimal delay as follows.

Definition 1. Given a threshold $T_v$ and an error guarantee $\delta_v$ the $\delta_v$-deficient thresholded count, $\hat{N}_v$, satisfies the following properties.

$$0 \leq \hat{N}_v < T_v \text{ when } N_v < T_v$$

$$N_v(1-\delta_v) < \hat{N}_v < N_v \text{ when } N_v \geq T_v$$

Where it is clear from context, the qualification is dropped and reference is to N, T, δ. Note that this definition is distinct from the heavy hitter definition in data streams, which requires an additive error that scales as the sum of all monitored counts; instead, exemplary embodiments have a much more demanding design constraint to monitor all counts with the relative error on each count being above the threshold. Without a threshold, T, the communication overhead is high to begin with, as low counts require every update to be pushed to the coordinator 102 in order to maintain the error guarantee, δ. Because low counts are typically uninteresting for monitoring applications, by suppressing the communication for these counts, the overhead of the monitoring can be kept low.

The value of the threshold depends on individual applications. For applications in network monitoring the track anomalous behavior (e.g., a DDoS attack), the value of the threshold can be high, while applications that count the traffic sent by hosts or networks beyond a certain initial minimum (e.g., traffic accounting) can use a lower threshold value.

Basic Approach

The basic approach of the exemplary embodiments is to set local thresholds at each remote site 104 such that the current count is bounded by the local threshold. When a local threshold in a remote site 104 is violated, the remote site 104 will communicate this to the coordinator 102 and set a new threshold. The ith remote site 104 maintains local thresholds, $t_{i,j}$, $j=0,1,\ldots$, and ensures that $t_{i,f(i)} \leq N_{v,i} < t_{i,f(i)+1}$ for some threshold f(i) that is known to the coordinator 102. If in the ith remote site's 104 count violates this condition, the remote site 104 sends an update to the coordinator 102 with a new f'(i) and $t_{i,f'(i)+1}$ such that $t_{i,f'(i)} \leq N_{v,i} < t_{i,f'(i)+1}$ for the current value of $N_{v,i}$. The coordinator 102 can use the set of $t_{i,f(i)}$ to estimate any global count as $$\hat{N}_v = \sum_{i=1}^{m} t_{i,f(i)}.$$

While the count at a remote site 104 obeys the $t_{i,f(i)} \leq N_{v,i} < t_{i,f(i)+1}$ bounds, the remote site 104 does not send any updates until the count is outside these bounds. Until the coordinator 102 receives the next threshold update the actual count can lie anywhere between the two threshold values.

Hence, the maximum error contributed to the global count error by remote site i is given by $t_{i,f(i)+1}-t_{i,f(i)}$. An algorithm that tracks counts must ensure that the error is within the δ-deficient design constraint when the count is greater than the specified threshold. Formally, it is desirable for exemplary embodiments to ensure that $$0 < \sum_{i \in \{1...m\}} t_{i,f(i)+1} - t_{i,f(i)} < \delta N_v$$

when $N_v > T$. Thus, adjacent thresholds need to be chosen to be close enough to satisfy this design constraint. The total number of updates sent from the remote sites 104 to the coordinator 102 corresponds to the number of threshold boundaries crossed at the remote sites 104. This means it is desirable to set the local thresholds as far apart as possible to minimize the communication overhead.

Algorithms that track the δ-deficient with thresholded count of an item need to balance the error design constraint with minimal indication overhead. There are two fundamental categories for setting the threshold: static thresholding and adaptive thresholding. In static thresholding methods, each remote site 104 is assigned a predetermined set of thresholds that cannot change over the entire course of tracking the count. It simply tracks between which pair of thresholds its count currently lies and informs the coordinator 102 when this changes. In the adaptive case, when old thresholds are violated, new thresholds at the remote sites 104 are chosen by the central coordinator 102, according to the observed conditions, to dynamically reduce the indication overhead.

While the adaptive thresholding methods can be expected to perform better than the static methods, the static methods are desirable with the capabilities of the remote sites 104 and the coordinator 102 are limited. The adaptive thresholding places additional processing overhead and additional functional design constraints on the remote sites 104 and the coordinator 102. The coordinator 102 needs to re-compute new thresholds and export them to the remote sites 104. In addition to processing updates from the remote sites 104 to maintain the count, in certain cases (e.g., sensor networks, high-speed routers), this additional processing overhead may be too expensive to accommodate. A further practical issue with using adaptive thresholding is that it is desirable for the system to be more resilient to network delays. Specifically, the coordinator 102 may need to collect current values from sites 104 to send out many new thresholds, which incurs appreciable delay, where the current counts may be outdated. The static thresholding scheme does not have this problem because the communication is performed from the remote site 104 to the coordinator 102 only. Thus, the choice of adaptive for static thresholds in exemplary embodiments depends not only on the relative cost, but also on the underlying network properties and performance.

Static Thresholds

In exemplary embodiments, the static thresholding scheme maintains the δ-deficient thresholded counts. In these schemes, the threshold values in the remote sites 104 are predetermined and do not change over the period of tracking. Exemplary embodiments include three such threshold assignment regimes to determine the local threshold values at the remote sites 104 and their complexity in terms of communication overhead is discussed. All the remote sites 104 are symmetric and, hence, use the same set of static threshold values. In these exemplary embodiments, the focus is on determining the local threshold values in the remote sites 104 for a given value of δ and T. The static threshold assignment problem can be formally stated as below.

Definition 2. Given m remote sites 104 of global threshold T and error guarantee δ and f(i) (the current threshold level at site i), determine threshold values $t_j$, $j=[0, \infty)$ such that the following constraints are satisfied.

$$\forall j \geq 0: t_{j+1} > t_j \text{ and } t_0 = 0$$

$$\forall f \in \mathbb{N}^m: \sum_{i=1}^{m} t_{f(i)+1} - t_{f(i)} \leq \delta \sum_{i=1}^{m} t_{f(i)} \text{ when } \sum_{i=1}^{m} t_{f(i)+1} \geq T$$

The first constraint ensures that the threshold values are increasing. The second constraint captures the error design constraint of the thresholded count problem. The maximum error in the ith remote site 104 when f(i) is the threshold in force at site i is $t_{f(i)+1} - t_{f(i)}$. Thus, the second constraint states that the total error in the count at the coordinator 102 must satisfy the thresholded error guarantee for all possible threshold values at the remote sites 104.

Uniform Threshold Assignment

The simplest solution is to keep the maximum global error level at δT at all times, even when the global count, N, is much greater than T. This can be accomplished by sitting the threshold levels of each monitor as $$t_j = \frac{j\delta T}{m}.$$

When $N \geq T$, the total error is $$\sum_{i=1}^{m} t_{f(i)+1} - t_{f(i)} \leq \delta T \leq \delta N$$

thus satisfying the δ-deficient thresholded count constraints. If the global count is N, the maximum number of updates sent to the coordinator 102 is given by $$\left\lfloor \frac{mN}{\delta T} \right\rfloor.$$

This simplicity comes at a price. Exemplary embodiments of the method work well for counts that are small (i.e., below T or only above T by a small amount), because the threshold gaps a relatively large. However, as N increases above T, the cost scales linearly with N as the overly tight error guarantee is maintained. This is summarized in the following Lemma.

Lemma 1. The total number of messages from all remote sites 104 to the coordinator 102 with uniform threshold assignment is $$O\left(\frac{mN}{\delta T}\right).$$

Proportional Threshold Assignment

A more scalable solution is to assign threshold values proportional to the local count at the remote site 104, in one embodiment. The thresholds at the remote site 104 are assigned as $t_j=(1+\delta)t_{j-1}$ and $t_0=0, t_1=1$. If the threshold value reported by remote site i 104 to the coordinator 102 is $t_{f(i)}$, the maximum possible error from the remote site 104 is $t_{f(i)+1}-t_{f(i)}=\delta t_{f(i)}$. The maximum error at the coordinator 102 is:

$$\sum_{i=1}^{m} t_{f(i)+1} - t_{f(i)} = \sum_{i=1}^{m} \delta t_{f(i)} \leq \delta \sum_{i=1}^{m} N_i = \delta N$$

where N is the global count. This assignment satisfies the error design constraint, even when the global count is less than the threshold T.

Lemma 2. The total number of messages from all remote sites 104 to the coordinator 102 with proportional threshold assignment is $$O\left(\frac{m}{\delta} \log \frac{N}{m}\right).$$

Proof. If $t_{f(i)} \leq N_i < t_{f(i)+1}$, the number of updates for remote site i 104 is given by f(i). Because $t_{f(i)}=(1+\delta)^{f(i)-1}$ we get $$f(i) = 1 + \frac{\log(t_{f(i)})}{\log(1+\delta)} \leq 1 + \frac{\log(N_i)}{\log(1+\delta)}$$

the total number of messages is bounded by $$\sum_{i=1}^{m} f(i) \leq m + \sum_{i=1}^{m} \frac{\log(N_i)}{\log(1+\delta)} \leq m + m\frac{\log\left(\frac{N}{m}\right)}{\log(1+\delta)}$$

we used the facts that $$\sum_{i=1}^{m} N_i = N, \sum_{i=1}^{m} \log N_i = \log\left(\prod_{i=1}^{m} N_i\right), \text{ and } \prod_{i=1}^{m} N_i$$

is maximized when $$\forall i: N_i = \frac{N}{m}.$$

Because for $$\delta < 1, \log^{-1}(1+\delta) = O\left(\frac{1}{\delta}\right),$$

the stated bound follows.

This exemplary embodiment of the method of assignment performs well when $N \gg T$. The relative cost of the uniform assignment to the proportional assignment is $$O\left(\frac{m}{\delta \log\left(\frac{N}{m}\right)}\right) \bigg/ O\left(\frac{Nm}{\delta T}\right) = O\left(\frac{T}{N \log\left(\frac{N}{m}\right)}\right).$$

When T is greater than N, the uniform spread assignment performs better, but as N increases above T, the proportional assignment requires fewer communications.

Blended Threshold Assignment

The main idea of exemplary embodiments using blended threshold assignment is to exploit the best features of the previous two assignments and provide a mechanism to tune the performance for different values of N.

Definition 3. The blend assignment sets the local threshold values as follows.

$$t_j = (1+\alpha\delta)t_{j-1} + (1-\alpha)\frac{\delta T}{m}$$

For a parameter $0 \leq \alpha \leq 1$ $t_0=0$ and when $\alpha=1$, $t_1=1$

Note that $\alpha=0$ corresponds to the uniform assignment, while $\alpha=1$ corresponds to the proportional assignment. Varying the value of $\alpha$ helps in tuning the threshold values to combine uniform and proportional thresholds.

Theorem 4. The blended threshold assignment satisfies the $\delta$-deficient thresholded error guarantee for all values of $\alpha \in [0, 1]$.

Proof. Using the blended threshold assignment, the maximum error in the ith remote site 104 is $$t_{f(i)+1} - t_{f(i)} = \alpha \delta t_{f(i)} + (1-\alpha)\frac{\delta T}{m}.$$

Thus, the total error in the global count is given by $$\sum_{i=1}^{m} t_{f(i)+1} - t_{f(i)} = \alpha\delta\left(\sum_{i=1}^{m} t_{f(i)}\right) + (1-\alpha)\delta T$$

$$\leq \alpha\delta N + (1-\alpha)\delta T$$

$$\leq \delta N, \text{ when } N > T.$$

Lemma 3. The total number of messages from all remote sites 104 to the coordinator 102 with blended threshold assignment and $0 < \alpha < 1$ is $$O\left(\frac{m}{\alpha\delta} \log\left(1 + \alpha\left(\frac{N}{T} - 1\right)\right)\right).$$

Proof. The threshold values using the blend of assignment for $\alpha \in (0,1)$ can be written as $$t_j = \left(\frac{(1+\alpha\delta)^j - 1}{\alpha\delta}\right)\frac{(1-\alpha)\delta T}{m}.$$

Thus, the number of updates from remote site i 104 when the threshold value exceeded is f(i) is:

$$f(i) = \frac{\log\left(1 + t_{f(i)} \frac{\alpha m}{(1-\alpha)T}\right)}{\log(1+\alpha\delta)} \leq \frac{\log\left(1 + N_i \frac{\alpha m}{(1-\alpha)T}\right)}{\log(1+\alpha\delta)},$$

because $$t_{f(i)} \leq N_i = \frac{\log(1+\alpha h_i) - \log(1-\alpha)}{\log(1+\alpha\delta)},$$

where $$h_i = \frac{N_i m}{T} - 1.$$

Note that given $$\sum_{i=1}^{m} h_i = \frac{Nm}{T} - m,$$

the expression $\Pi_{i=1}^{m}(1+\alpha h_i)$ is maximized when $$\forall i : h_i = h = \frac{N}{T} - 1.$$

The total number of updates from all remote sites 104 is $$\sum_{i=1}^{m} f(i) = \frac{\log\left(\prod_{i=1}^{m}(1+\alpha h_i)\right) - m\log(1-\alpha)}{\log(1+\alpha\delta)} \quad (1)$$

$$\leq m \frac{\log(1+\alpha h) - \log(1-\alpha)}{\log(1+\alpha\delta)} \quad (2)$$

Upper bounding this expression gives the stated worst-case bound.

Determining the Optimum Value of α

In exemplary embodiments, for small values of N<T, α=0 gives the best possible assignment and for large values of N>>T, α=1 gives the best assignment. For intermediate values of N, the best value of α can be determined by minimizing the number of updates.

Note that the communication cost in Lemma 3 is dependent on the global count, N. Hence, the optimal value of α depends on N. Exemplary embodiments include tow approaches to determining the best value of α. The first approach is to track the global count and determine an expected value of N, $N_e$ after a long period of observation and use this value to determine the optimal value of α. This can be expected to result in good performance if the actual value of N does not vary a lot from the estimate $N_e$. A more sophisticated approach is to track the distribution of N over a large set of observations and determine the value of α that minimizes the expected number of update messages over this distribution, in one exemplary embodiment.

Theorem 5. The total number of updates (from equation 2)

$$K_N = m \frac{\log(1+\alpha h) - \log(1-\alpha)}{\log(1+\alpha\delta)}$$

is a convex function in α in the range α∈(0,1) for small values of δ.

Theorem 6. Given an expected value of N or a discrete probability distribution of N, it is possible to find the value of α that minimizes the number of messages with the blended threshold assignments.

Proof. First, observe that if p(N) is the probability density function of N, then the expected maximum number of updates given by $$K = \sum_{N=1}^{\infty} p(N) K_N$$

is a convex function in α in the range α∈(0,1). Because K is a convex combination of convex functions, $K_N$,K is itself convex.

Because K and $K_N$ are convex functions in α in the range α∈(0,1), there exists a single minimum for K and $K_N$ that can be searched by using techniques, such as gradient descent. The descent algorithm can be used to determine the optimal values of α for both the approaches. In the first approach where the expected value $N_e$ is given, determine the optimal value of α by minimizing $KN_e$. In the second approach, where the distribution of N is given, use the descent method to determine the optimal value of α by minimizing the function K as defined above.

Adaptive Thresholds.

Unlike the status thresholding scheme, in the adaptive threshold scheme, the coordinator 102 adaptively sets the thresholds of the monitoring nodes 104 every time there is a threshold violation in a node. In other words, the coordinator 102 not only receives the threshold violations from the monitoring nodes 104, but also reacts to them by sending new thresholds back. This gives the coordinator 102 more power to set thresholds based on more information about how the distributions at each site 104 are evolving and, hence, to try to reduce the number of threshold violations. In a general scenario, the coordinator 102 may reset thresholds for arbitrary subsets of the nodes 104 based on a complete history of past violations, in some embodiments. In preferable exemplary embodiments, the coordinator 102 reacts to each threshold violation and considers only recent history.

Adaptive Threshold Assignment Problem

In exemplary embodiments using the adaptive thresholding scheme, two levels of thresholds, lower and higher thresholds, are maintained at every node 104 at all times. The lower threshold at node i 104 is denoted by $t_{iL}$ and the higher threshold by $t_{iH}$ so that at all times $t_{iL} \leq N_i \leq t_{iH}$. If these thresholds are violated (i.e., if this condition is no longer true), then the site i 104 contacts the coordinator 102 with its current count $N_i$ and it resets its lower threshold $t_{iL}=N_i$. The coordinator 102 estimates the count as the sum of the reported counts from the remote sites 104, $$\hat{N} = \sum_{i=1}^{m} t_{iL}.$$

The coordinator 1022 then updates the $t_{iH}$ for node i 104 (and possibly those of other nodes 104) to ensure that its count still meets the δ-deficient design constraint. To minimize the communication in the system 100, the coordinator 102 needs that the upper threshold to as high a value as possible. Note that the maximum error contributed by site i 104 is $t_{iH}-t_{iL}$.

The problem of setting the upper thresholds of the remote sites 14 by the coordinator 102 can be formally stated as follows.

Definition 7. Given m remote monitoring nodes 104, a global threshold T, an error guarantee δ, and a threshold violation from node j, the objective is to determine the higher threshold values $t_{iH}$ it all m monitoring nodes 104 such that the number of messages in the monitoring system 100 is kept as low as possible and the following design constraints are satisfied.

$$\forall 1 \leq i \leq m, t_{iH} > t_{iL}$$

$$\sum_{i=1}^{m} t_{iH} - t_{iL} \leq \delta \sum_{i=1}^{m} t_{iL}, \text{ when } \sum_{i=1}^{m} t_{iH} \geq T$$

Similar to the static thresholding scheme, the first constraint ensures that the higher thresholds are greater than the lower thresholds in all the nodes 104 and the second constraint ensures that the total error in the count at the coordinator 102 must satisfy the thresholded error guarantee.

In the static threshold method, the remote sites 104 do not know if the current global count is greater than T or lesser at any time. Hence, the thresholds need to be set to handle both these cases. A key advantage of the adaptive algorithm is that when the global count is less than the threshold, the coordinator 102 can afford to set higher thresholds at the remote sites 104 than in the static algorithm. To illustrate this, define the slack in the system as the difference between the threshold and the current estimate of the global count, S=T-$\hat{N}$. The coordinator 102 can now split this slack among remote sites 104 in any manner and still be able to satisfy the δ-deficient error design constraint. Assume that the slack is split among remote sites 104 as $n_i$, t=1, . . . , m, such that $$\sum_{i=1}^{m} n_i \leq S.$$

Thus, $t_{iH}=t_{iL}+n_i$. If the counts at all the remote sites 104 are less than their respective upper thresholds, then the global count must be lesser than the global threshold, because $$N < \sum_{i=1}^{m} t_{iH} \leq T.$$

If at any point the global count exceeds the threshold, at least one of the thresholds in the remote sites 104 will be exceeded. This allows the coordinator 102 to determine when the count exceeds the threshold and switch to the case when N≧T and track the count closely to satisfy the δ-deficient error design constraint.

Basic Adaptive Algorithm

When the total count estimated at the central site 102, $\hat{N}$, is less than T, a naïve approach is to split the slack equally among all the nodes 104. Instead, exemplary embodiments split the difference proportional to the current count in the nodes 104, because nodes 104 that have larger counts than others are likely to grow larger by setting the new $$t_{iH} = t_{iL} + \frac{\left(T - \sum_{j=1}^{m} t_{jL}\right) t_{iL}}{\sum_{j=1}^{m} t_{jL}} = t_{iL} \frac{T}{N}.$$

If $\hat{N} \geq (1-\delta)T$, set $t_{iH}-t_{iL}=\delta t_{iL}$ so that the maximum error in each node 104 is $\delta t_{iL}$. This approach is similar to the proportional spread threshold assignment algorithm for static thresholding problem. FIG. 2 (and Table 2 below) lists pseudo code for one exemplary embodiment of a basic adaptive thresholding algorithm.

TABLE 2

Exemplary Basic Adaptive Thresholding Algorithm

BasicAdapt(δ, T, m)

1:  $t_{iL} \leftarrow 0; t_{iH} \leftarrow \frac{T}{m}; \hat{N} \leftarrow 0$

2:  loop {receive update (i, $N_i$);}
3:    if (N < (1 − δ)T) and (N + ($N_i$ − $t_{iL}$) ≧ (1 − δ)T) then
4:      poll all sites j for $N_j$; $t_{jL} \leftarrow N_j$; send $t_{jH} \leftarrow (1 + \delta)t_{jL}$;
5:    $t_{iL} \leftarrow N_i; \hat{N} \leftarrow \Sigma_{j=1}^{m} N_j;$
6:    if (N < (1 − δ)T) then 7:      for all j send $t_{jH} \leftarrow t_{jL} \frac{T}{N}$ to j;

8:    else
9:      send $t_{iH} \leftarrow t_{iL} (1 + \delta)$ to i

Line 7 performs the proportional split when the counts are small and line 9 performs the proportional growth when the counts are large. Lines 3 and 4 handle the case of switching from $\hat{N}<(1-\delta)T$ to $\hat{N} \geq (1-\delta)T$.

Lemma 4. The adaptive thresholding assignment algorithm presented in FIG. 2 satisfies the δ-deficient thresholded count constraints.

Proof. When $$\hat{N} = \sum_{i=1}^{m} t_{iL} < (1-\delta)T, N = \sum_{i=1}^{m} N_i < \sum_{i=1}^{m} t_{iH} = \frac{T}{N} \sum_{i=1}^{m} t_{iL} = T$$

so it is known that the total count is less than the threshold T. When $\hat{N} \geq (1-\delta)T$, it is known that the total count exceeds $(1-\delta)T$ and the algorithm is similar to the proportional spread threshold assignment algorithm for the static thresholding scheme. In this case $t_{iH}-t_{iL}=\delta t_{iL}$ and so $$\sum_{i=1}^{m}(t_{iH}-t_{iL})=\delta \hat{N} \leq \delta N$$

as required.

In this exemplary embodiment of the basic adaptive thresholding algorithm, while a coordinator 102 is receiving updates (e.g., a count of messages observed) from m sites 104 in a distributed monitoring system 100, the coordinator 102 needs to be able to estimate a total count for of the sites 104 in response to a query. The coordinator 102 performs the basic adaptive algorithm of FIG. 2 to estimate the total count within a predetermined error bound. The algorithm includes the following parameters: δ, T, and m, where δ is a desired error guarantee, T is a predetermined threshold value, and m is the number of sites 104. In addition, other variables include the identifier, i, which uniquely identifies each site 104, $t_{iH}$, which is an upper threshold, $t_{iL}$, which is a lower threshold, $\hat{N}$, which is the an estimate of the current total count, $N_j$, which is the local count at site i, and $(1-\delta)T$, which is a critical threshold below which there is no violation.

In this exemplary embodiment, for each received update (Line 2), if the current estimated total count is within the allowable error and the increase in the estimated total count for the current update would still be within the allowable error (Line 3), this means that the current update would push the estimated total count above the threshold and, in this case, the coordinator 102 polls all the sites 104 to get local counts (Line 4). Each site i 104 has a lower threshold (i.e., $t_{iL}$) and an upper threshold (i.e., $t_{iH}$). At all times, the local count, $N_i$, is within these two thresholds, because the thresholds are adaptively set by the coordinator 102 (Line 4). The coordinator 102 re-computes these two thresholds for each site i 104. Each site i only sends updates when one of the thresholds is violated. The lower threshold at site i 104 is set to the local count (Line 5) and upper threshold for all the sites 104 is increased by setting the upper threshold to the lower threshold at that site 104 plus an allowable error (Line 4).

In this exemplary embodiment, the estimated total count is set to the sum of all the local counts received from all of the sites 104 (line 5) i.e., an exact total counts.

In this exemplary embodiment, if this estimated total count is under the critical threshold (Line 6) (i.e., still no violation), then the coordinator 102 sends a new value for the upper threshold to each site 104 which is the lower threshold at that site multiplied by a factor (Line 7) to split the slack among the sites 104. The factor is the predetermined threshold divided by the estimated total count. Otherwise, if there is a violation (Line 8), then (Line 9) the upper thresholds at the sites 104 are increased by setting the upper threshold to the lower threshold at that site 104 plus an allowable error.

Although the basic adaptive algorithm is simple and intuitive, it has some drawbacks. The first time there is a threshold violation from some remote site i 104, the $t_{iH}$ value at the node 104 is set to T, while the value at all other nodes 104 will be set to 0, because $N_j=0$ at the coordinator site 102, initially. This could unnecessarily trigger many communications, especially when several nodes 104 have non-zero counts. Secondly, when the estimated aggregate count at the central node 102 is close to T, the new threshold will be very close to the old threshold, thus triggering many threshold violations. Exemplary embodiments of the modified adaptive algorithm address these shortcomings.

Modified Adaptive Algorithm

In order to avoid the problems in the basic adaptive algorithm, exemplary embodiments of the modified adaptive algorithm are modify the original algorithm, as shown in FIG. 3 (and Table 3 below).

TABLE 3

Exemplary Modified Adaptive Thresholding Algorithm

ModifiedAdapt(δ, T, m)

1:    $t_{iL} \leftarrow 0; t_{iH} \leftarrow \frac{T}{m}; R \leftarrow \emptyset; \hat{N} \leftarrow 0$ 2:    loop {receive update (i, $N_i$);}
3:      if ($\hat{N} < (1-\delta)T$) and ($\hat{N} - t_{iL} + N_i \geq (1-\delta)T$) then
4:        poll all sites j for $N_j$; $t_{jL} \leftarrow N_j$; send $t_{jH} \leftarrow (1+\delta)t_{jL}$;
5:        if (R = ∅) then
6:          for j = 1 to m do 7:            Poll site j for $N_j$; $t_{jL} \leftarrow N$; $s_j \leftarrow \max\left(t_{jL}, \frac{\delta T}{m}\right)$;

8:            if $N_j < \frac{\delta T}{m}$ then send $t_{jH} \leftarrow \frac{\delta T}{m}$ to j 9:        $t_{iL} \leftarrow N_i; \hat{N} \leftarrow \sum_{j=1}^{m} t_{jL}; s_i \leftarrow t_{iL}; R \leftarrow R \cup \{i\}$;
10:        if ($\hat{N} < (1-\delta)T$) then 11:          $S \leftarrow \sum_{r=1}^{m} s_r; t_{min} \leftarrow \min_j \left\{\frac{t_{jL}}{\sum_{r \in R} t_{rL}}\right\}$;

12:          for all j ∈ R do

13:            if $t_{min} < \frac{\delta T}{m}$ then send $t_{jH} \leftarrow \frac{\delta T}{m}$ to j 14:            else send $t_{jH} \leftarrow t_{jL} + \frac{t_{jL}}{\sum_{r \in R} t_{rL}}(T-S)$ to j 15:        else send $t_{iH} \leftarrow t_{iL}(1+\delta)$ to i There are two main differences between the original (FIG. 2) and modified (FIG. 3) algorithms for adaptive thresholds. First, as soon as the central node 102 receives the first threshold violation, the $t_{iH}$ values in all the nodes 104 whose counts $N_i$ are below $$\frac{\delta T}{m}$$

are initialized to $$\frac{\delta T}{m}.$$

Second, when the difference between global threshold and the estimated aggregate count is small (i.e., below $$\left(\text{i.e., below } \frac{\delta T}{m}\right),$$

instead of using the adaptive strategy of distributing the difference to all the nodes exemplary embodiments maintain a constant difference between the upper or lower thresholds, i.e., $$t_{iH} - t_{iL} = \frac{\delta T}{m}.$$

In the algorithm listed in FIG. 3, this exemplary embodiment maintains a set R of nodes 104 whose count exceeds $$\frac{\delta T}{m}.$$

Lines 5-9 deal with the first threshold violation by polling all nodes 104 to initialize S and by setting upper bounds for the nodes 104 not in R. If the total count is sufficiently below T, Lines 10-14 allocate the slack in proportion to the counts; however, this exemplary embodiment ensures that the difference between higher lower thresholds is at least $$\frac{\delta T}{m}$$

using extra variables $s_i$ to ensure that the total amount of slack allocated states within the permitted bounds. Lines 3-4 deal with the case when the count first exceeds T and from that point on, this exemplary embodiment switches to proportionally increasing counts (line 15), as before.

Lemma 5. The exemplary embodiment of the modified adaptive thresholding assignment algorithm presented in FIG. 3 satisfies the δ-deficient thresholded count constraints.

Proof. Consider the case when $\hat{N}<(1-\delta)T$. If a remote site i 104 does not belong to $$R \, (i \notin R), \, t_{iH} = \frac{\delta T}{m},$$

in line 11, the rest of the available slack T−S is proportionally divided to the rest of the sites ∈R 104. The term $t_{min}$ denotes the minimum of the slack values. If $$t_{min} < \frac{\delta T}{m},$$

that all sites ∈R 104 are allocated the slack of $$\frac{\delta T}{m}$$

in line 13 of the algorithm. Hence, $$N < \sum_{i=1}^{m} t_{iH} = \hat{N} + \sum_{i=1}^{m} \frac{\delta T}{m} < T.$$

If $$t_{min} > \frac{\delta T}{m},$$

then the slacks are proportionally allocated to the sites 104. Hence, $$N < \sum_{i=1}^{m} t_{iH} = T,$$

because me algorithm allocates the slack in the system 100 to the sites 104. Thus, if $\hat{N}<(1-\delta)T$, N<T. When $\hat{N} \geq (1-\delta)T$, the total count exceeds $(1-\delta)T$ and the algorithm follows the proportional spread threshold assignment in the static scheme, and the proof is the same as the previous Lemma. Thus, the modified algorithm satisfies the δ-deficient error constraints.

Theorem 8. The total number of messages from all remote sites 104 to the coordinator 102 using the exemplary embodiment of the modified adaptive algorithm in FIG. 3 is $$O\left(\frac{m}{\delta}\left(m + \log\left(\frac{N-T}{m}\right)\right)\right) \text{ when } N > T \text{ and } O\left(\frac{m^2 N}{\delta T}\right) \text{ when } N \leq T.$$

Proof. The analysis is split into two parts: first, when the total count is less than T, and second when it exceeds T. In the first part, the algorithm ensures that the "slack" in each threshold, i.e., $t_{iH}-t_{iL}$ is always at least $$\frac{\delta T}{m}.$$

Thus, there can be at most $$\frac{mN}{\delta T}$$

threshold violations before the count reaches T, simplifying to $$\frac{m}{\delta}$$

when N first exceeds T. Each threshold violation causes at most O(m) messages to be sent, to inform the sites 104 of their new high thresholds, $t_{iH}$. When the count is above T, the algorithm mimics the proportional threshold assignment case and adapting Lemma 2, the number of messages between remote sites 104 and the central site 102 to go from T to N is $$O\left(\frac{m}{\delta}\log\frac{N-T}{m}\right).$$

The result follows by summing these two bounds.

Note that one can easily force $$\Omega\left(m^2 + \frac{m}{\delta}\log\frac{N-T}{m}\right)$$

messages by first making one site have count $$\frac{T}{m},$$

then setting $$\frac{m}{2}$$

counts $$N_i = \frac{\delta T}{m}$$

(to set up the adaptive thresholds). Then, for each of the same m/2 sites in turn, set their local count to $$N_i = \frac{T}{m};$$

each of these settings causes θ(m) messages, over $$\frac{m}{2}$$

sites gives the $\Omega(m^2)$ bound. Using the remaining $$\frac{m}{2}$$

sites (currently with zero local count each), one can then elicit the $$\frac{m}{2} + \frac{m}{2}\frac{\log\frac{2(N-T)}{m}}{\log(1+\delta)} = \Omega\left(\frac{m}{\delta}\log\left(\frac{N-T}{m}\right)\right)$$

cost from the proportional threshold settings. However, in general, this algorithm expects to do much better than this worst case bound, because the analysis is somewhat pessimistic.

In this exemplary embodiment of the modified adaptive thresholding algorithm, the following cases are addressed: Lines 1-4 are the same as in the basic adaptive thresholding algorithm of FIG. 2, Lines 5-9 address the first threshold violation, Lines 10-14 addressed the case where the current update is below the critical threshold, and Line 15 is a catchall case. The algorithm includes the following new terms: R is a set of all the sites 104 where the local count is greater than a minimum initial error, the slack at the coordinator 102 is δT, $$\frac{\delta T}{m}$$

is the minimum initial error, $s_j$ is maximum possible count at a site 104, S is the sum of $s_i$, T−S is the slack in the system, and $t_{min}$ is used to proportionally allocated slacks to the sites 104.

Initially, there are many updates sent to the coordinator 102 from sites 104, because the lower threshold is initialized to zero (Line 1). At Line 5, none of the sites 104 have a local count greater than the minimum initial error. In other words, all of the sites have a local count less than the minimum initial error. In this case, when the first threshold violation is received by the coordinator 102, the coordinator 102 polls all the sites 104 (Line 7) and sets the lower threshold at each site 104 to the local count at that site 104. In addition, the coordinator 102 sets the maximum possible count at each site 104 to either the lower threshold or the minimum initial error, whichever is greater. At Line 8, if the local count is still less than the minimum initial error at any site 104, then the upper thresholds are set to the minimum initial error. Therefore, after the first threshold violation, the upper thresholds are set to the minimum initial error. The coordinator 102 sets the lower threshold for the site 104 that just provided the current update to that current update value (Line 9). In addition, the estimate of total counts is set to the sum of all the lower thresholds and the maximum possible count at each site 104 is set to the lower threshold. Finally, the site 104 that just provided the current update that was the first threshold violation is added to the set of sites where the count is greater than the minimum initial error (Line 9).

When the current update is below the critical threshold (Lines 10-14), the rest of the available slack is proportionally divided to the rest of the sites 104 (Line 11). All the sites 104 where the count is less than the minimum initial error (Line 12) are allocated a slack of the minimum initial error and the upper thresholds are set to the minimum initial error (Line 13). Then, the slacks are proportionally allocated to the rest of the sites based on the current counts (Lines 7, 9, and 14). Therefore, when the current update is below the critical threshold, the allowable slack in the system is allocated.

Exemplary embodiments include algorithms for static thresholding, adaptive thresholding, and modified adaptive thresholding. In the static case, whenever a threshold is violated, the site 104 sends an update to the coordinator 102. In the adaptive thresholding case, thresholds are adapted based on the updates received by the coordinator 102.

Negative Updates

Thus far, it is assumed that all updates received at remote sites 104 are non-negative. However, a simple observation is that the static protocols remain correct when negative updates are permitted. Instead of checking for thresholds being exceeded, one exemplary embodiment checks that the upper threshold remains an upper bound and that the lower threshold remains a lower bound. Similarly, the adaptive protocols can also handle negative updates with minor modifications in other embodiments. The analysis above that relates the cost of the protocol to the value of the global count no longer applies. Positive and negative updates can cause a lot of communication but leave the global count quite low. Thus, the communication bound cannot still hold. Indeed, if the updates cause counts to repeatedly cross the same threshold boundaries (in the static case), then the best bound is one that is linear in the number of updates.

Sliding Windows

Being able to handle negative updates means that the exemplary embodiments of the methods may be applied to other models of computing counts. Typically, it is not desirable to monitor counts that increase indefinitely. Indeed, in several of the queries time windows were implicitly given in the form of "within an hour" or "in a day". There are several exemplary embodiments of models for dealing with such time-windowed queries: periodic reset, sliding window, and overlapping window. For periodic reset, after the time period has elapsed one exemplary embodiment resets all accounts to zero and restarts the protocol. For sliding-window, one exemplary embodiment ensures that the current count covers exactly the last hour, for example, by keeping track of past updates and applying updates older than one hour as negative updates. In the case that there is insufficient storage to retain this many updates, then approximate information can be capped as explained below for one exemplary embodiment. A compromise between periodic reset and sliding-window is to apply the overlapping window approach. For example, the window consists of one hour's data, and the start of the window is advanced by five-minute intervals every five minutes (so that the window contains between one hour and one hour and five minutes of updates). Then the exemplary embodiment records the sum of updates in each five minutes and applies these as a single negative update when the start of the window is advanced.

Approximate Counts

So far, it has been assumed that there is sufficient storage capacity at the remote nodes to store all local count values. However, in the case when there are not very many updates of different values (for example, tracking network activity), this can assumption cannot be made. The same (static) thresholds and δ value for all counts may be used to reduce space usage, but there still may be too many counts to store. The natural solution is to adopt an approximate way of storing the counts. However, using such approximate structures means and that the guarantees are much weaker. Instead of the δ-deficient guarantee, a guarantee is given relative to $$\delta N_v + \varepsilon \sum_v N_v,$$

because the approximate counting methods return counts of each item with error $$\varepsilon \sum_v N_v.$$

Although ε can be reduced (at the cost of more space), in general, it is not possible to set a 9-0 value of ε that gives a δ-deficient guarantee. Hence, the result is more in line with those that follow for heavy-hitter style problems.

Time-Dependent Thresholds

Prior work has built models of how data varies with time, in order to reduce the communication cost further. A similar approach applied in some exemplary embodiments and the result is time-dependent local thresholds. The thresholds are set so that they increase or decrease as time passes, so that exemplary embodiments ensure that the total uncertainty remains within the same bounds. The idea is that the varying thresholds project where the true count will lie at time t; if this prediction is correct, then no communication cost is incurred. If any (now time-dependent) local threshold is broken, then communication is triggered with the coordinator 102 and the model can be re-calibrated with the recent history, in one embodiment.

Experimental Study

There was an experimental evaluation of the static and adaptive algorithms. In addition, the performance of these algorithms was compared with a prior technique referred to as the OJM algorithm, which attempts to minimize communication overhead while maintaining certain accuracy for continuous queries over a distributed data stream.

Setup

A simulator and was built with m monitoring nodes 104 and one central node 102. Although the definition of the thresholded counts problem is applicable in a variety of different scenarios, the focus of the experiments was on a distributed network monitoring system. In this scenario, every node 104 monitored traffic on the link for all the registered events and incremented account for all the events that were observed. An event was defined as the occurrence of a combination of destination IP address and the destination port number in a packet seen by a monitoring node 104. The publicly available link traces from the National Laboratory for Applied Network Research (NLANR) was used as input to the distributed monitoring system 100. These traces are for a single ingress link, and the data was transformed for the distributed system 100 by assigning a probability distribution for distributing packets randomly to the various monitors 104. By using different probability distributions, the various scenarios were simulated. That may occur in real networks. For example, a skewed probability distribution function represented a scenario where few nodes 104 (that were monitoring large inter-domain "peering" links) received large numbers of events, while others did not. Similarly, a uniform distribution represented a scenario where events were equally likely to occur in any of the monitoring nodes 104. Although events that occurred in the link traces from NLANR would tracked, for ease of illustration, the results were presented for tracking one event, whose overall count was 960,000. Exemplary embodiments of the static and adaptive algorithms were implemented. Since the OJW was not proposed to address the thresholded counts problem, certain parameters of the algorithm were set to apply it to the problem. The OJW algorithm assumes that a single node can monitor all the updates for a given object/event and a single query can include multiple objects. Because it was desirable for the experiments to track the same objects/events in multiple monitors, each item was treated in each site as a separate object/event that was the subject of a single query. In the thresholded counts problem definition, the error values are relative (i.e., the maximum error allowed for an event in the system is dependent on its current count). The original OJW algorithm uses absolute errors (i.e., the total error in the system is required to be below a certain constant value). To apply this, the maximum allowed error for each count was fixed at $\delta T$ divided evenly between all sites 104 where it could have occurred. These parameter settings of the OJW algorithm were the best effort to make the algorithm apply to the $\delta$-deficient thresholded count problem. This ensured that the algorithm generated results that were correct according to the problem definition (and the algorithm falls into the class of adaptive algorithms); however, the cost was much higher than the algorithms that were designed for this problem.

Performance Accuracy

In FIG. 4A, the total error in the distributed monitoring system was examined as packet survived at various monitoring nodes 104, while using the blended static threshold assignment. The values of T, $\delta$, and m were set to be 10,000, 5%, and 20 respectively. When the count of the event was less than T, the error in the system could be as high as 50%, but after the count exceeded the value of T, the error was always less than the value specified by $\delta$ (indicated by the heavy line on FIG. 4A). Different parameter settings yielded similar results.

Figure 4B:
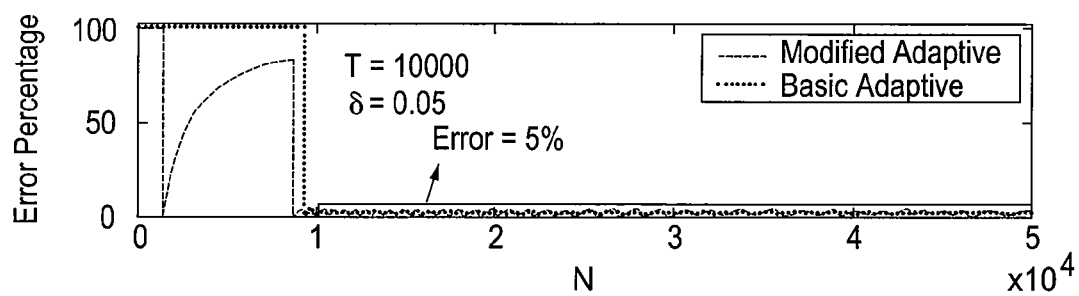
Figure 4C:
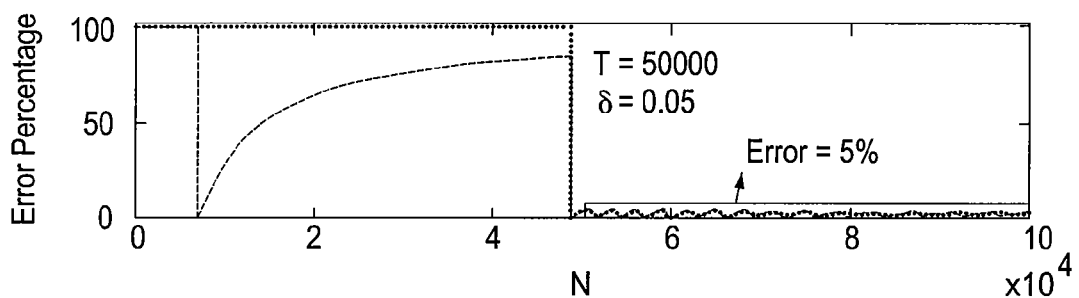
Figure 4D:
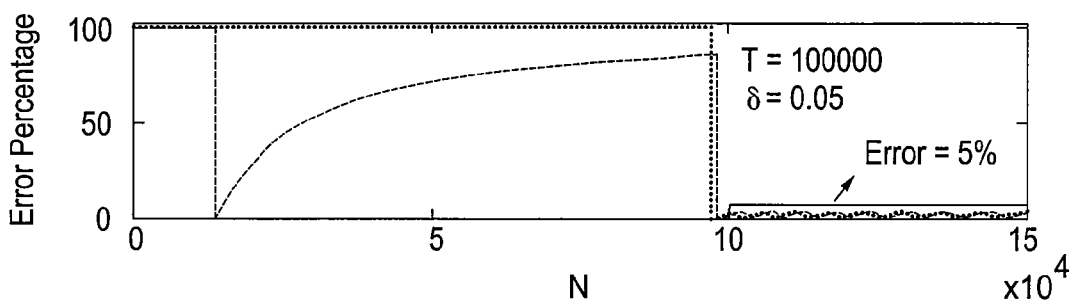

The results for the same experiment performed with the adaptive algorithms (the carrying values of T) are shown in FIGS. 4B-4D. The distinctive shape of the curve for the modified adaptive algorithm was explained by the different parts of the algorithm. The initial high error was due to allocating $t_{iH}$=T/m in the initial phase of the algorithm. The error dropped to zero when the central node 102 polled all the monitoring nodes 104 and, hence, had accurate count information. The error gradually increased when nodes 104 were allocated adaptive thresholds, which allowed the total error to grow (within the allocated bounds) until the count reached $(1-\delta)T$. Finally, the algorithm switched to proportionally growing thresholds, which kept the fractional error within the necessary bounds. It was observed that the total error in the system was less than the value specified by $\delta$ after the total count exceeded T. Meanwhile, the basic adaptive algorithm had consistently higher error for N>T, but also higher communication cost.

Setting $\alpha$ for the Static Algorithm

To validate the theoretical results, a comparison was made between the optimal value of $\alpha$ obtained from the theoretical model using a gradient descent approach was and the ideal value of a obtained from the experiments. For this experiment, a uniform distribution was used to send a given packet from the input file to the monitoring nodes 104. This was because the static threshold assignment algorithms had a worst case when the packets were uniformly distributed across the remote sites 104. The experiment was repeated 100 times to ensure that the outcome was not biased by outliers (while generating uniform distribution) and the experimental results shown are the average value from all of the 100 runs.

In the experiment, several different values for T and $\delta$ were considered. The range of values for T was [100, 100,000] and the range of values for a was [0.01, 0.1]. The total number of messages in the monitoring system using the blended static thresholding approach also depended on $N_i$, the count of the event in the monitor i. Hence in the experiments, the overall count of the event tracked in the range [2500, 960,000] was also varied. For each combination of values for T, $\delta$, and N (referred to as parameter settings), the value of $\alpha$ was varied from zero to one with increments of 0.001. For every parameter setting, the value of $\alpha$ that resulted in the minimum number of communications was computed, using both simulations and the theoretical model.

Figure 5A:
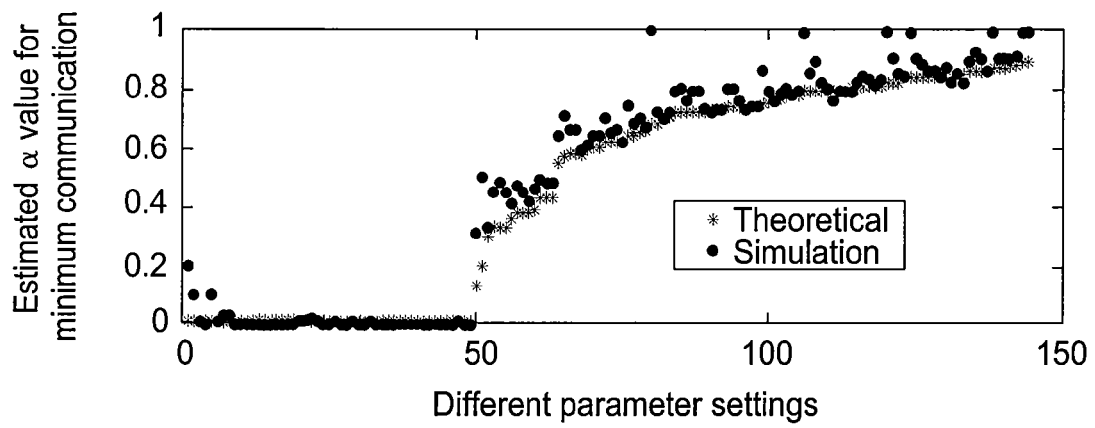
FIGS. 5A and 5B are charts comparing the optimal theoretical $\alpha$ values with the results obtained from the simulation in the experimental study.
Figure 5B:
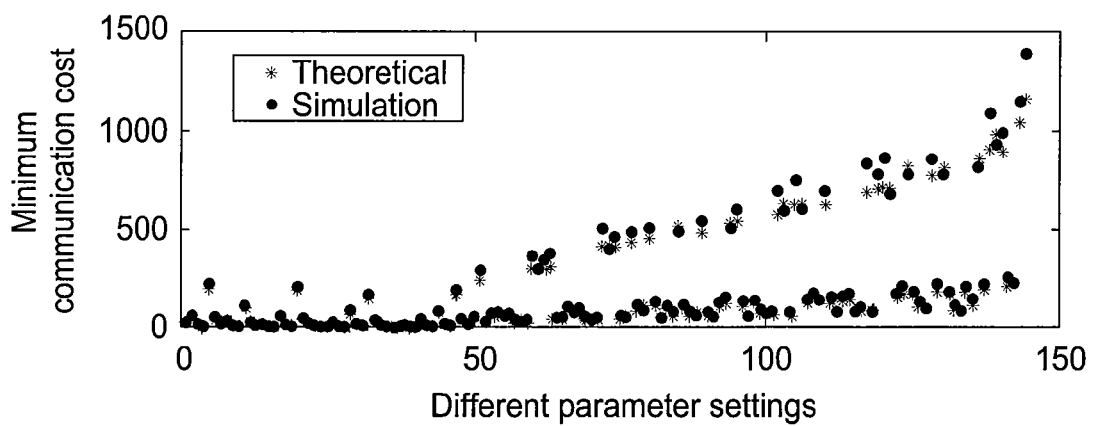

The comparison of the ideal values of a from the simulations and theoretical model is shown in FIG. 5A. Although the theoretical results closely matched the experimental values in most cases, there were a few cases where the difference between the two was significant. However, these had minimal impact on the overall cost, as shown in FIG. 5B. The discrepancies were mainly because integer values were used in the simulator, while the theoretical model ignored to this condition and considered thresholds to be real numbers. The difference between the experimental and theoretical results was significant only when the values of both T and $\delta$ were small (i.e., when the system required high accuracy). In most cases, the cost using the theoretically predicted a was as good as or better than the value found by simulation, and in only a few cases was very slight benefit for the empirically found value.

Communication Cost

Figure 6A:
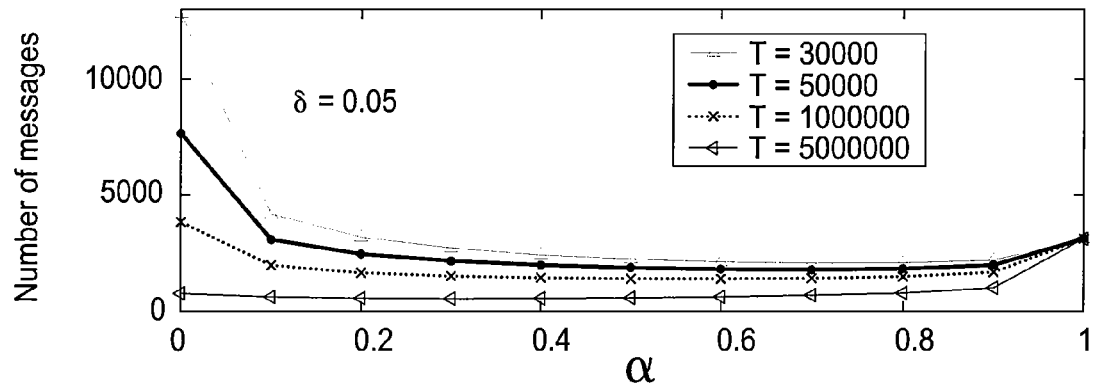
FIGS. 6A, 6B, 6C, and 6D are charts showing the communication cost of the static and adaptive algorithms in the experimental study.
Figure 6B:
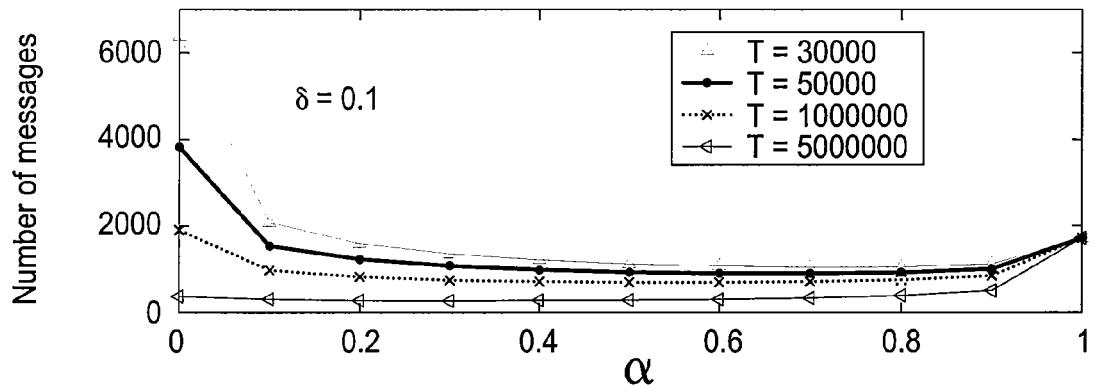

FIGS. 6A and 6B examine the impact of a on the number of messages exchanged in a monitoring system 100 using static thresholds. The total count, N, of the event that was tracked was 960,000. For a small value of T $$\left(\text{i.e., a high value of } \frac{N}{T}\right),$$

the optimal value of a was closer to zero. In essence, as the ratio $$\frac{N}{T}$$

decreased, the optimal value of a move towards zero. However, there was a broad range of settings of $\alpha$ that achieved similarly low costs, showing that an approximate value of $\alpha$, showing that an approximate value of a often sufficed. Lastly, in line with expectations, decreasing a increased total cost.

Figure 6C:
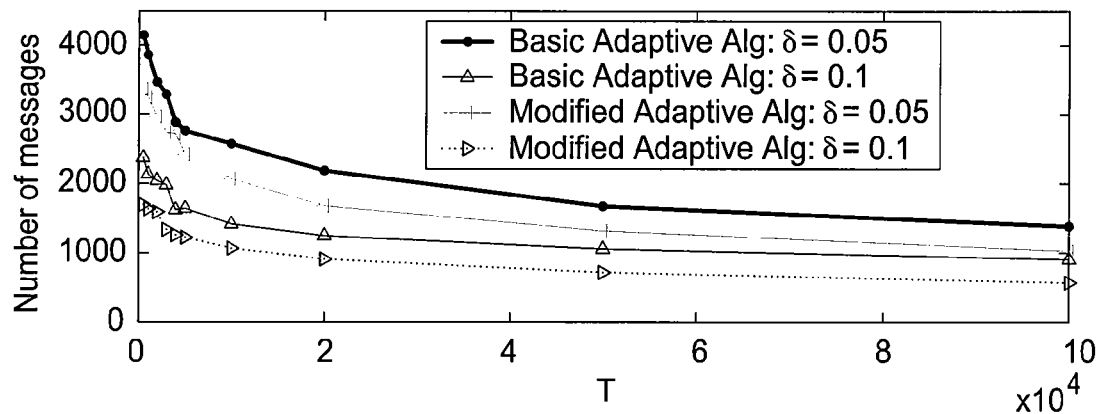
Figure 6D:
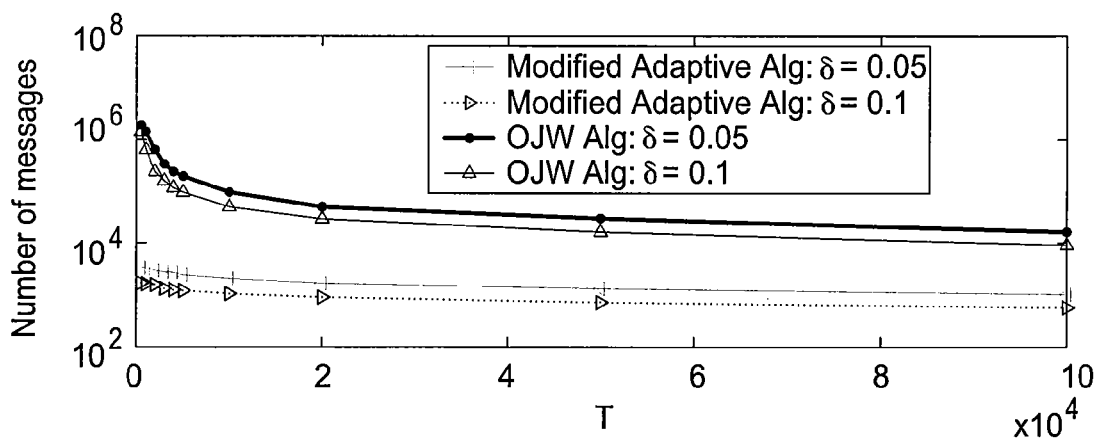

In FIGS. 6C and 6D, the performance of the basic adaptive modified adaptive and OJW algorithms were compared. FIG. 6C compared the total number of messages exchanged in the system (from the monitors 104 to the central node 102 and vice-versa) using basic adaptive and modified adaptive algorithms. The modified algorithm outperformed the basic algorithm by an appreciable factor in all the experiments. FIG. 6D compared the performance of the OJW algorithm with the modified adaptive algorithm. Note that the y-axis in this graph is in log scale. The graph shows that the modified algorithm performed at least two orders of magnitude better than the OJW algorithm, confirming that the existing techniques were insufficient for this problem.

Randomly Distributed Events

Figure 7:
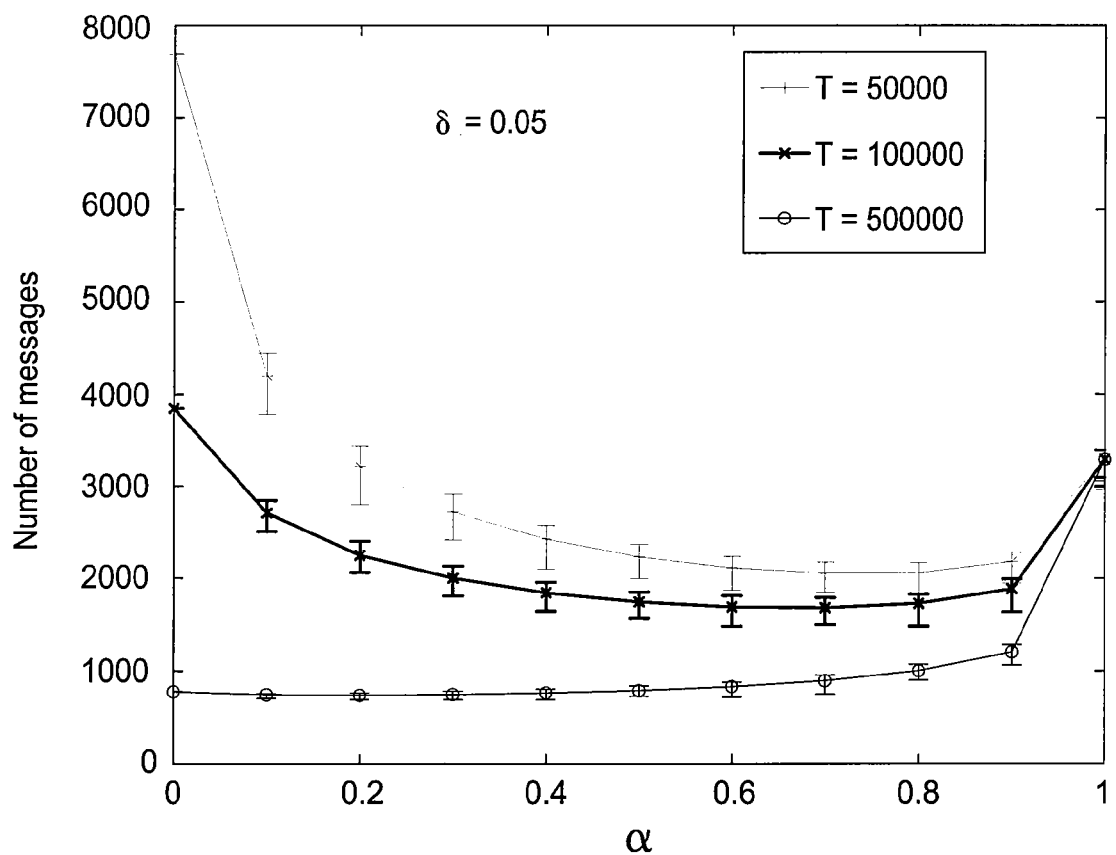
FIG. 7 is a chart showing the changes in communication cost with varying $\alpha$ in the static model for over 500 repetitions with random incoming packet distribution in the experimental study.

Previous results were based on selecting which node 104 to update uniformly. In FIG. 7, the effect of using random distributions to update different nodes was explored. Random distributions were created by generating random probabilities associated with each of the monitoring nodes 104. These probabilities were used to send the updates from the input trays to the monitoring nodes 104. Note that a different random distribution was generated for every simulation run. The simulation was repeated 500 times to ensure that a variety of different random distributions was captured. In FIG. 7, the average number of messages exchanged due to these random distributions was plotted. The error bars in FIG. 7 represent the range of values for the number of messages generated by the 500 runs of the simulator. The effect of using random distributions was relatively small. As before, the optimal value of a that resulted in the minimum number of messages in the system decreased as the ratio $$\frac{N}{T}$$

decreased. Note that the total number of messages in the best case (1000-2000) was approximately 0.1% of the total number of updates. Hence, a thousand-fold reduction in cost was observed compared to the cost of sending every update to the central site.

Comparing Costs of Static and Adaptive Algorithms

Figure 8:
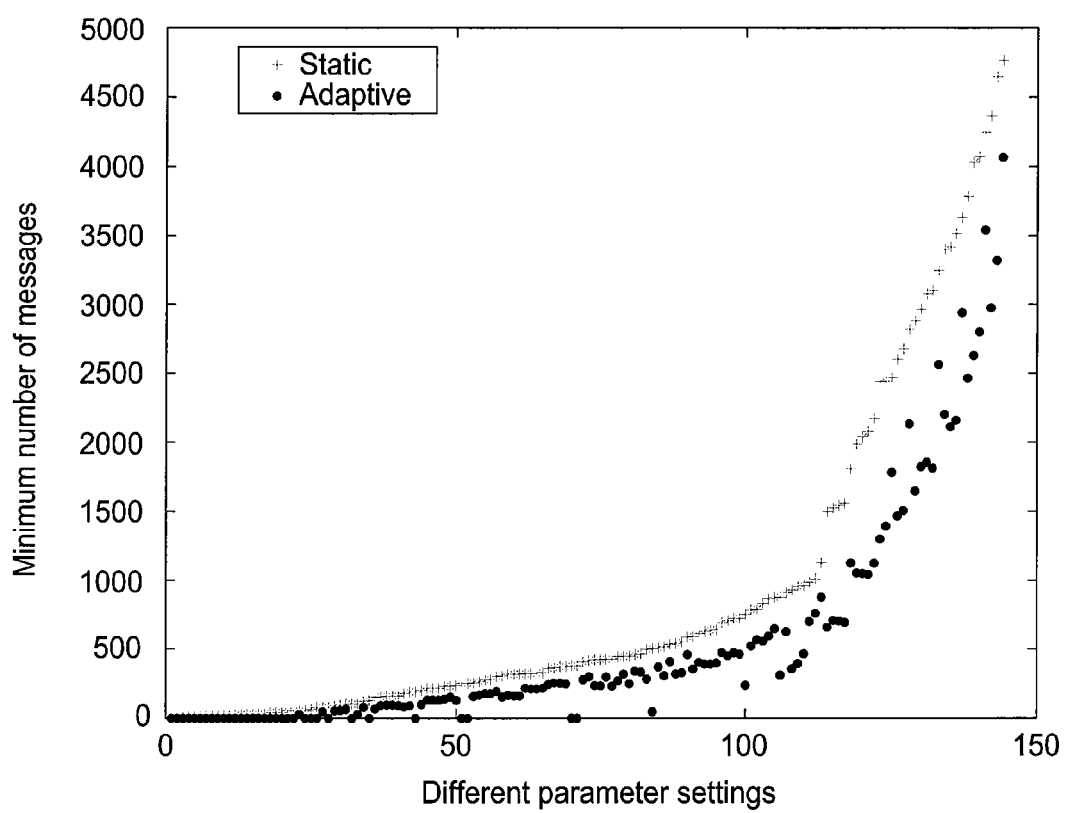
FIG. 8 is a chart comparing the cost of adaptive and static threshold setting in the experimental study.

FIG. 8 compared the blended static thresholding algorithm and the modified adaptive algorithm in terms of the number of messages in the monitoring system for different parameter settings. For growth algorithms the values of T, δ, and N were varied in the ranges of [100, 100,000], [0.01, 0.1], and [2500, 960,000] respectively. In the static algorithm, the empirically determined optimal value of α was used for the given parameter setting. The performance of the adaptive algorithm was always slightly better than the static algorithm. However, which method was best depended on the scenario in which they were being applied. Every message in the static algorithm was only a few bytes long (to indicate the current threshold being used by the site 104) while the messages for longer in the adaptive algorithms, because the central site 102 had to give more information (the type of message, the new threshold being sent, etc.). In power-constrained sensor networks, the energy consumption of the adaptive algorithms may therefore be higher, whereas, in more traditional wired networks, the size of message headers will make the difference in size of the messages insignificant.

Experiments on Real Network Data

The above experiments tracked a single event. In order to explore a more realistic and practical scenario, the complete network packet traces from a research network were obtained. The network consisted of several routers and anonymous traces of all the packets that entered the network at each of the routers were obtained for one hour, on Aug. 15, 2005. The network monitoring system architecture consisted of monitoring nodes 104 one collocated with every router in the network. The traces were used from the collocated router as the input to the monitoring node 104. The monitoring nodes 104 tracked all the incoming events for one hour, approximately 8 million in total.

Figure 9A:
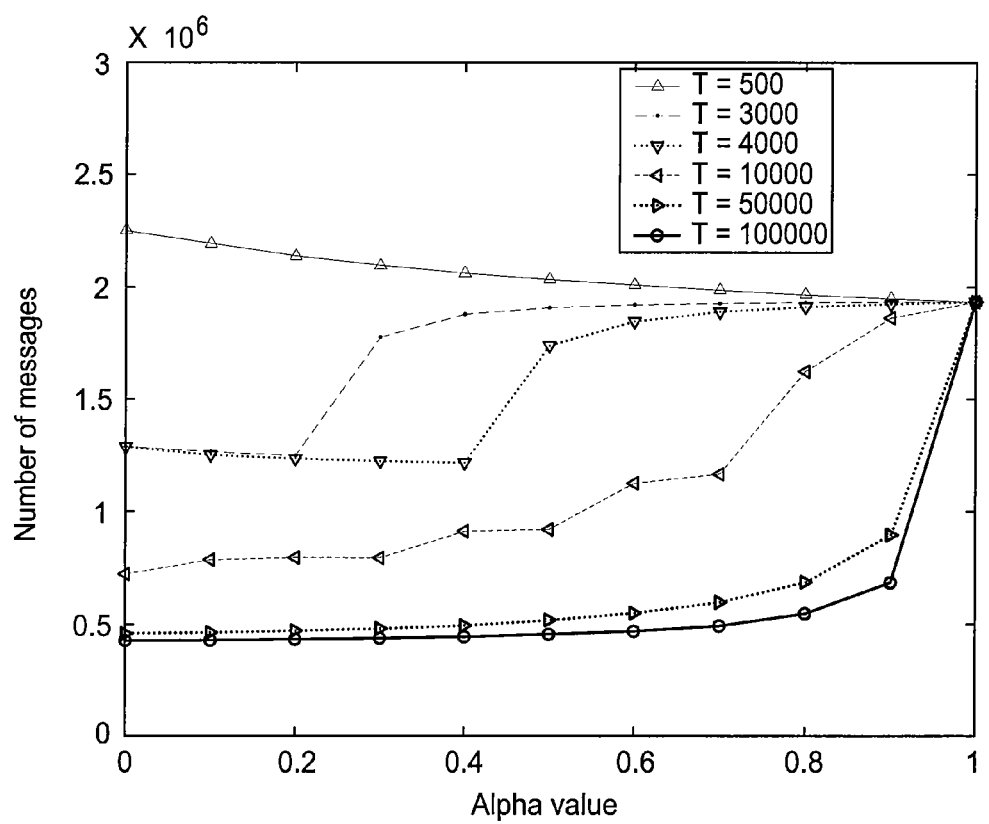
FIGS. 9A and 9B are charts showing experiments on real network data in the experimental study.
Figure 9B:
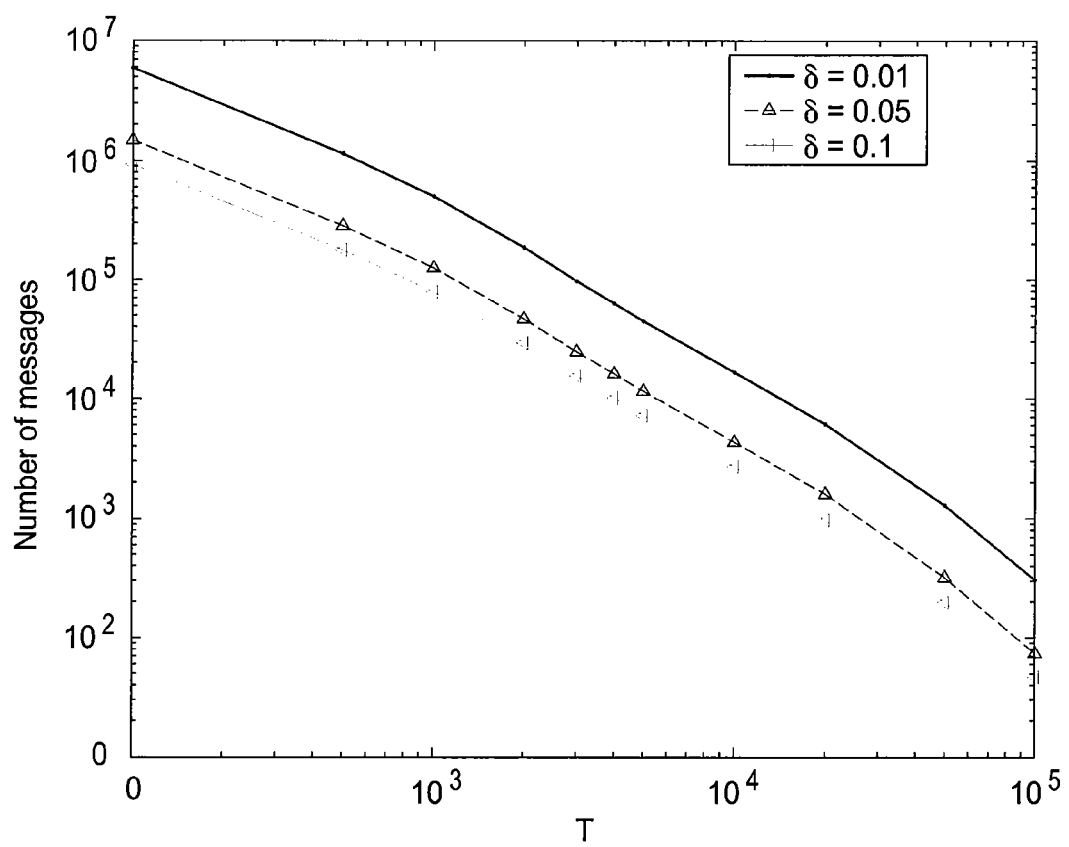

FIG. 9A shows the number of messages required by the static monitoring system to track all of the events with δ-accuracy. When the value of T was small, a high value of α resulted in minimum communication overhead and at higher values of T, the best value of α reduced. FIG. 9B shows the number of messages in the monitoring system using adaptive threshold. Comparing FIGS. 9A and 9B, at large values of T revealed that the adaptive algorithm performed significantly better than the static algorithm. Because FIG. 9B was plotted on a log-log scale, it showed an approximately linear relation between the logarithm of the number of messages and log T, implying an inverse polynomial dependency on T. This agreed with the analysis of the adaptive algorithm, suggesting that the bulk of the cost was due to items, whose count was $N_v$<T. For these items, the number of messages was proportional to $$\frac{N_v}{\delta T}$$

which agreed with the observed behavior.

The exemplary embodiments of algorithms efficiently monitor distributed sets of counts in the continuous fashion, which is a fundamental problem at the heart of many network and sensor monitoring problems. In the experimental of valuation, it was observed that the adaptive algorithms typically outperformed those based on maintaining static thresholds. However, the adaptive algorithms may be more expensive in terms of resources required to run and computational power of the participants.

Figure 10:
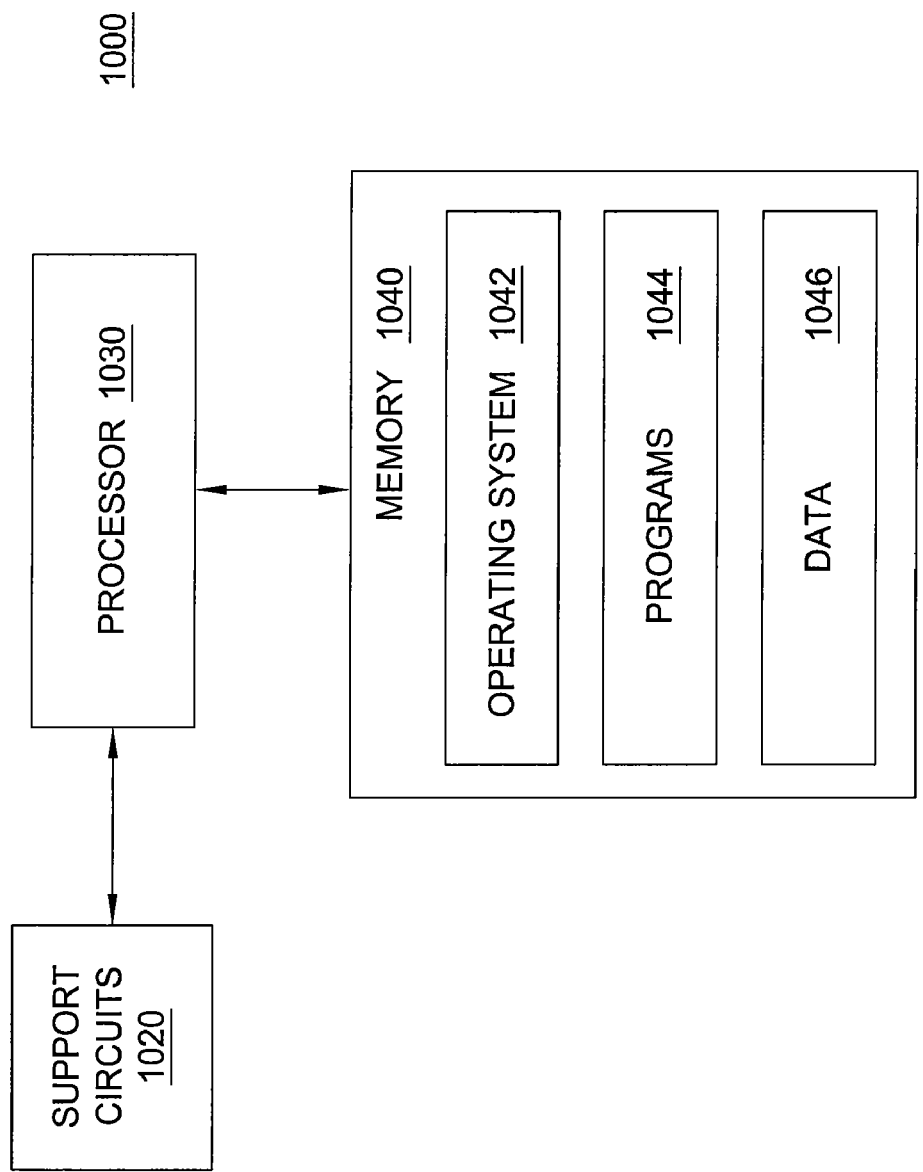
FIG. 10 is a high-level block diagram showing a computer.

FIG. 10 is a high-level block diagram showing a computer. The computer 1000 may be employed to implement embodiments of the present invention. The computer 1000 comprises a processor 1030 as well as memory 1040 for storing various programs 1044 and data 1046. The memory 1040 may also store an operating system 1042 supporting the programs 1044.

The processor 1030 cooperates with conventional support circuitry such as power supplies, clock circuits, cache memory, and the like as well as circuits that assist in executing the software routines stored in the memory 1040. As such, it is contemplated that some of the steps discussed herein as software methods may be implemented within hardware, for example, as circuitry that cooperates with the processor 1030 to perform various method steps. The computer 1000 also contains input/output (I/O) circuitry that forms an interface between the various functional elements communicating with the computer 1000.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media and/or stored within a working memory within a computing device operating according to the instructions.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A method for distributed network monitoring, comprising:

Assigning, by a computer, at least one fault condition threshold to each of a plurality of sites, each fault condition threshold assignment is blended so that the fault condition threshold assignment is a linear combination of a uniform threshold and a proportional threshold, the fault condition thresholds being determined using each of a uniform fault condition threshold determination method and a proportional fault condition threshold determination method;

applying at least one determined fault condition threshold in a manner tending to minimize a number of fault condition updates generated by a corresponding site;

receiving at least one update from each a site only after the a fault condition threshold is violated at the site; and estimating a total count of violations for all the sites based on the updates received.

2. The method of claim 1, wherein the fault condition threshold assignment is uniform so that a slack is statistically the same at each site.

3. The method of claim 1, wherein the fault condition threshold is re-assigned after the threshold is violated to be proportional to a local count at the site.

4. The method of claim 1, wherein a determined blend of uniform or proportional assignment is adapted to minimize the number of updates.

5. The method of claim 1, wherein the fault condition threshold assignment is adapted after each threshold violation.

6. The method of claim 1, wherein the fault condition threshold assignment is adapted after a first threshold violation, when a difference between a global threshold and an estimated current total count is less than a predetermined bound.

7. The method of claim 1, wherein the fault condition threshold comprises a lower threshold and an upper threshold and a constant difference between the lower and upper threshold is maintained for each site.

8. A system for distributed network monitoring, comprising: a plurality of sites each having at least one fault condition threshold, the fault condition thresholds being determined using each of a uniform fault condition threshold determination method and a proportional fault condition threshold determination method each site only sending an update after the fault condition threshold is violated; and a coordinator for receiving the updates, assigning the at least one fault condition threshold, each fault condition threshold assignment is blended so that the fault condition threshold assignment is a linear combination of a uniform threshold and a proportional threshold and the coordinator estimates a total count of violations for all the sites based on the updates received.

9. The system of claim 8, wherein the fault condition threshold assignment is uniform so that a slack is statistically the same at each site.

10. The system of claim 8, wherein the fault condition threshold is re-assigned after the threshold is violated to be proportional to a local count at the site.

11. The system of claim 8, wherein a determined blend of uniform or proportional assignment is adapted to minimize the number of updates.

12. The system of claim 8, wherein the fault condition threshold assignment is adapted after each threshold violation.

13. The system of claim 8, wherein the fault condition threshold assignment is adapted after a first threshold violation and when a difference between a global threshold and an estimated current total count is less than a predetermined bound.

14. The system of claim 8, wherein the fault condition threshold comprises a lower threshold and an upper threshold and a constant difference between the lower and upper threshold is maintained for each site.

15. A non-transitory computer-readable medium storing instructions, which when executed by a processor direct an operation of a computer to perform a method for distributed network monitoring, the method comprising:

assigning at least one fault condition threshold to each site of a plurality of sites, each fault condition threshold assignment is blended so that the fault condition threshold assignment is a linear combination of a uniform threshold and a proportional threshold, the fault condition thresholds being determined using each of a uniform fault condition threshold determination method and a proportional fault condition threshold determination method;

applying at least one determined fault condition threshold in a manner tending to minimize a number of fault condition updates generated by a corresponding site;

receiving at least one update from a site only after a fault condition threshold is violated at the site; and estimating a total count of violations for all the sites based on the updates received.

16. The non-transitory computer-readable medium of claim 15, wherein the fault condition threshold assignment is applied after each threshold violation.

17. The non-transitory computer-readable medium of claim 15, wherein the fault condition threshold assignment is applied after a first threshold violation, and when a difference between a global threshold and an estimated current total count is less than a predetermined bound.

* * * * *